US012670826B2

(12) United States Patent
Bae et al.

(10) Patent No.: US 12,670,826 B2
(45) Date of Patent: Jun. 30, 2026

(54) ELECTRONIC DEVICE AND METHOD FOR DETERMINING RENDERING FREQUENCY

(71) Applicant: SAMSUNG ELECTRONICS CO., LTD., Suwon-si (KR)

(72) Inventors: Daewoong Bae, Suwon-si (KR); Hyunseuk Kyung, Suwon-si (KR); Donghyun Kim, Suwon-si (KR); Sangheon Kim, Suwon-si (KR); Jeongseob Kim, Suwon-si (KR); Hoomin Lee, Suwon-si (KR); Woohyeong Cheon, Suwon-si (KR); Seonghoon Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/054,217

(22) Filed: Feb. 14, 2025

(65) Prior Publication Data

US 2025/0336324 A1     Oct. 30, 2025

Related U.S. Application Data

(63) Continuation of application No. PCT/KR2025/000439, filed on Jan. 8, 2025.

(30) Foreign Application Priority Data

Apr. 30, 2024    (KR) ........................ 10-2024-0057918
May 30, 2024    (KR) ........................ 10-2024-0070773

(51) Int. Cl.
G06F 9/451        (2018.01)
G09G 3/20         (2006.01)
G09G 5/377        (2006.01)

(52) U.S. Cl.
CPC .............. *G09G 3/20* (2013.01); *G06F 9/451* (2018.02); *G09G 2340/0435* (2013.01); *G09G 2354/00* (2013.01)

(58) Field of Classification Search
CPC ...... G09G 3/20; G09G 3/3266; G09G 3/3275; G09G 5/00; G09G 5/12; G09G 5/14;
(Continued)

(56) References Cited

U.S. PATENT DOCUMENTS 10,257,786 B2    4/2019  Zajac
11,386,866 B2    7/2022  Sin et al.
(Continued)

FOREIGN PATENT DOCUMENTS

JP          6784435 B2      11/2020
KR     10-2014-0030226 A      3/2014
(Continued)

OTHER PUBLICATIONS

International Search Report (PCT/ISA/210) dated Apr. 17, 2025 issued by the International Searching Authority in International Application No. PCT/KR2025/000439.
Written Opinion (PCT/ISA/237) dated Apr. 17, 2025 issued by the International Searching Authority in International Application No. PCT/KR2025/000439.

*Primary Examiner* — Chanh D Nguyen
*Assistant Examiner* — Nguyen H Truong
(74) *Attorney, Agent, or Firm* — Sughrue Mion, PLLC

(57)            ABSTRACT

Disclosed is an electronic device and method for displaying an execution window of an application on a display. The method includes executing a first application and a second application, displaying a first execution window of the first application, and displaying a visual object related to a service provided by the first application at a first rendering frequency in a rendering region within the first execution window. The method includes displaying a second execution window of the second application, obtaining a first user (Continued)

input to move the second execution window over the first execution window, and based on obtaining the first user input, identifying whether the first execution window and the second execution window overlap at least in part.

20 Claims, 22 Drawing Sheets

(58) Field of Classification Search
CPC .. G09G 5/36; G09G 5/377; G09G 2340/0435; G09G 2354/00; G06F 1/16; G06F 1/20; G06F 1/3287; G06F 3/01; G06F 3/14; G06F 3/0481; G06F 3/0484; G06F 3/04842; G06F 8/38; A63F 13/355; A63F 13/358; H04L 12/46; H04L 12/853; H04L 29/06; H04L 65/80; H04N 5/45; H04N 7/01; H04N 7/025; H04N 7/088; H04N 7/173; H04N 23/63; G06T 1/20; G06T 5/50; G06T 7/10; G06T 7/62; G06T 15/00; G06T 15/50
See application file for complete search history.

(56) References Cited

U.S. PATENT DOCUMENTS

| | | | |
|---|---|---|---|
| 2007/0250788 A1* | 10/2007 | Rigolet | G06F 3/0481 |
| | | | 715/788 |
| 2011/0145879 A1 | 6/2011 | Rajamani et al. | |
| 2012/0306912 A1 | 12/2012 | Blanco et al. | |
| 2013/0235059 A1* | 9/2013 | Yamamoto | G09G 5/377 |
| | | | 345/589 |
| 2018/0239499 A1 | 8/2018 | Santoro et al. | |
| 2020/0252680 A1 | 8/2020 | Panchaksharaiah et al. | |
| 2022/0208145 A1 | 6/2022 | Glen | |
| 2023/0305864 A1* | 9/2023 | Zhong | G09G 5/14 |
| 2023/0335064 A1 | 10/2023 | Her et al. | |
| 2024/0404165 A1* | 12/2024 | Rai Kurlethimar | G02B 27/017 |

FOREIGN PATENT DOCUMENTS

| | | | |
|---|---|---|---|
| KR | 10-1523133 | B1 | 5/2015 |
| KR | 10-2021-0092571 | A | 7/2021 |
| KR | 10-2315899 | B1 | 10/2021 |
| KR | 10-2022-0105886 | A | 7/2022 |
| KR | 10-2023-0116334 | A | 8/2023 |

* cited by examiner

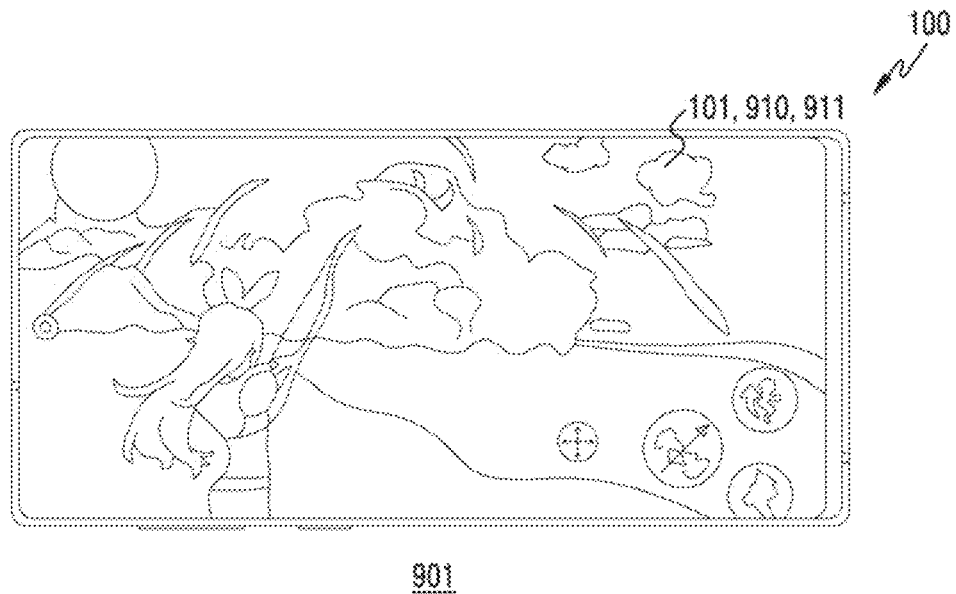
901
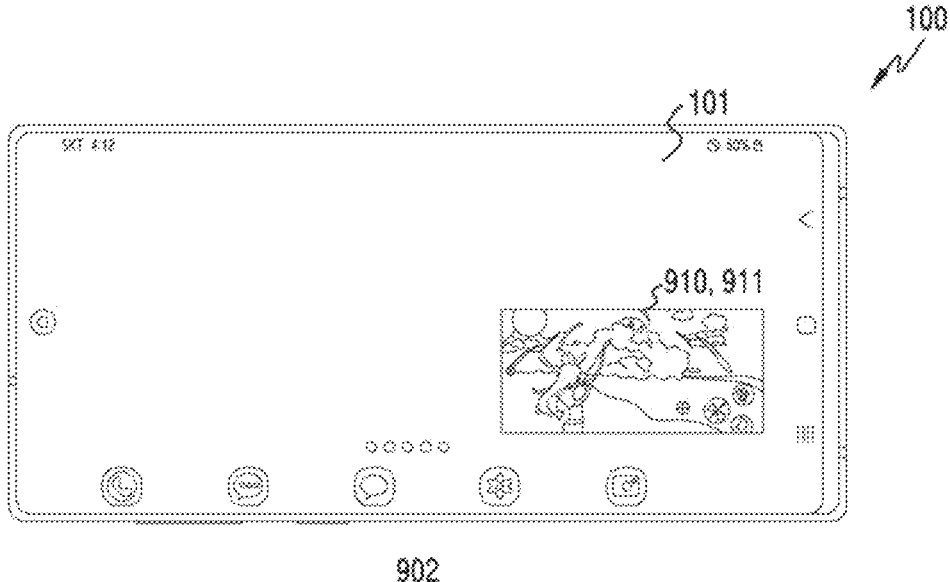
902
FIG.9

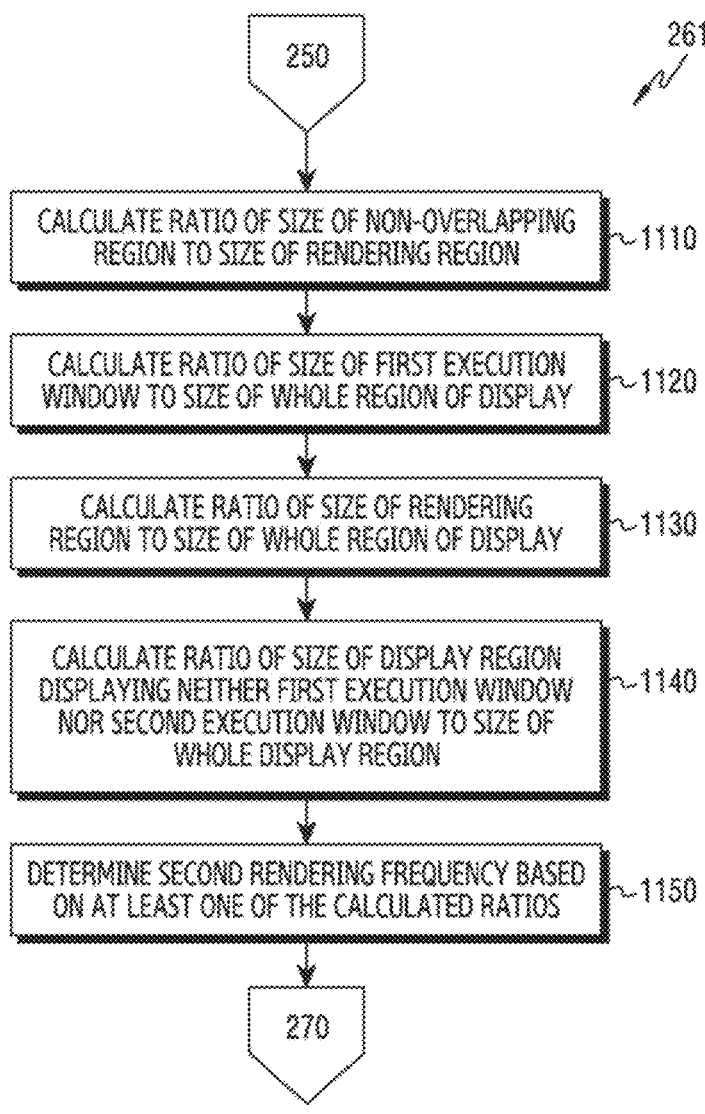

261

250

CALCULATE RATIO OF SIZE OF NON-OVERLAPPING
REGION TO SIZE OF RENDERING REGION    ~1110

CALCULATE RATIO OF SIZE OF FIRST EXECUTION
WINDOW TO SIZE OF WHOLE REGION OF DISPLAY    ~1120

CALCULATE RATIO OF SIZE OF RENDERING
REGION TO SIZE OF WHOLE REGION OF DISPLAY    ~1130

CALCULATE RATIO OF SIZE OF DISPLAY REGION
DISPLAYING NEITHER FIRST EXECUTION WINDOW
NOR SECOND EXECUTION WINDOW TO SIZE OF
WHOLE DISPLAY REGION    ~1140

DETERMINE SECOND RENDERING FREQUENCY BASED
ON AT LEAST ONE OF THE CALCULATED RATIOS    ~1150

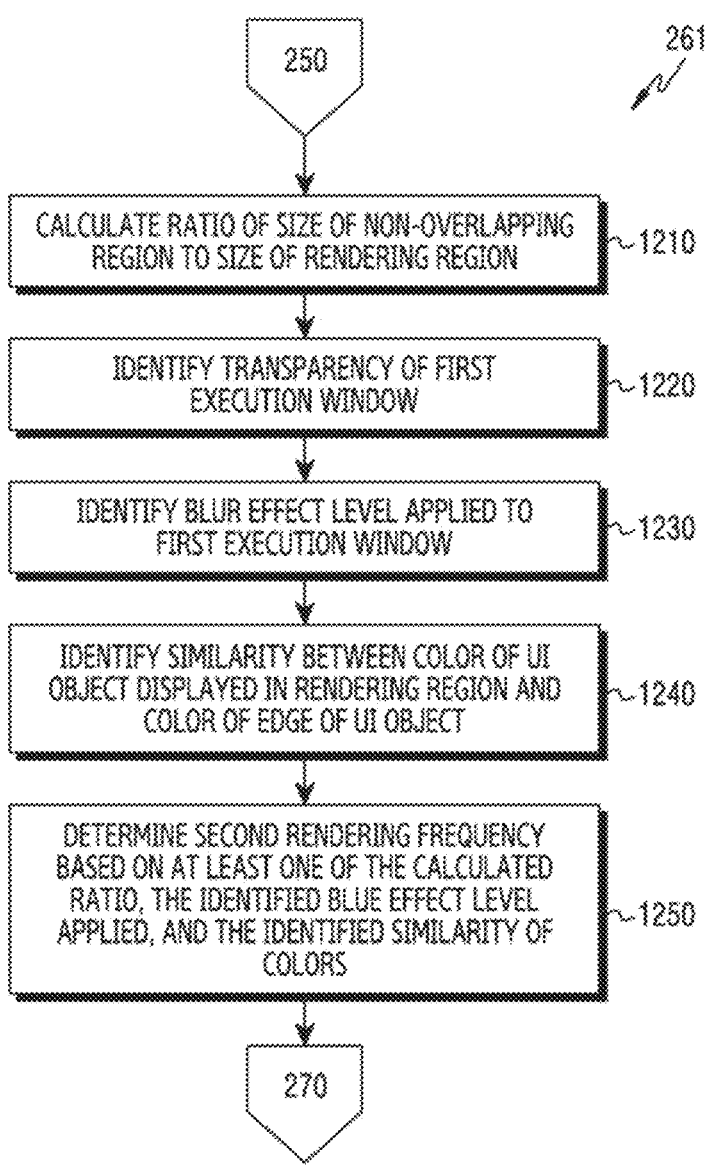

250

261

CALCULATE RATIO OF SIZE OF NON-OVERLAPPING
REGION TO SIZE OF RENDERING REGION — 1210

IDENTIFY TRANSPARENCY OF FIRST
EXECUTION WINDOW — 1220

IDENTIFY BLUR EFFECT LEVEL APPLIED TO
FIRST EXECUTION WINDOW — 1230

IDENTIFY SIMILARITY BETWEEN COLOR OF UI
OBJECT DISPLAYED IN RENDERING REGION AND
COLOR OF EDGE OF UI OBJECT — 1240

DETERMINE SECOND RENDERING FREQUENCY
BASED ON AT LEAST ONE OF THE CALCULATED
RATIO, THE IDENTIFIED BLUE EFFECT LEVEL
APPLIED, AND THE IDENTIFIED SIMILARITY OF
COLORS — 1250

ELECTRONIC DEVICE AND METHOD FOR DETERMINING RENDERING FREQUENCY

CROSS REFERENCE TO RELATED APPLICATIONS

This application is a bypass continuation application of International Application No. PCT/KR2025/000439, filed on Jan. 8, 2025, which is based on and claims priority to Korean Patent Application No. 10-2024-0057918, filed on Apr. 30, 2024, in the Korean Intellectual Property Office, and Korean Patent Application No. 10-2024-0070773, filed on May 30, 2024, in the Korean Intellectual Property Office, the disclosures of which are incorporated by reference herein in their entireties.

BACKGROUND

1. Field

The disclosure relates to an electronic device and a method for determining a rendering frequency.

2. Description of Related Art

Electronic devices (e.g., a mobile device, a smartphone, or a wearable device) may provide various functions (e.g., a music playback function, a navigation function, a short-range wireless communication (e.g., Bluetooth, wireless fidelity (Wi-Fi), or near-field communication (NFC)) function, a fingerprint recognition function, an electronic payment function).

In addition, the electronic devices may output various visual objects through a display. For example, the electronic devices may output an execution window of an application on the display. The electronic device may refresh the output of the display at a designated refresh rate (e.g., 120 Hz). In addition, the electronic device may generate frames of image data displayed on the display screen at a designated frame rate (e.g., 60 fps). Further, applications may perform a rendering operation of generating and updating the image data to be displayed within the application execution window at a rendering frequency corresponding to the designated frame rate.

The foregoing information is provided for the purpose of aiding understanding of the disclosure.

SUMMARY

An electronic device according to an embodiment of the disclosure may include a display, a memory for storing instructions, and at least one processor.

According to an aspect of the disclosure, there is provided a method of an electronic device for displaying an execution window of an application on a display, the method including: executing a first application and a second application; controlling to display a first execution window of the first application, and controlling to display a visual object related to a service provided by the first application at a first rendering frequency in a rendering region within the first execution window; controlling to display a second execution window of the second application; obtaining a first user input to move the second execution window over the first execution window; based on obtaining the first user input, identifying whether the first execution window and the second execution window overlap at least in part; based on the first execution window and the second execution window overlapping at least in part, identifying a second rendering frequency for displaying the visual object in a first non-overlapping region based on at least two of an overlapping region being obscured by the second execution window in the rendering region of the first execution window, the first non-overlapping region being not obscured by the second execution window in the rendering region of the first execution window, or the rendering region; and controlling to display the visual object in the first non-overlapping region at the second rendering frequency.

Identifying the second rendering frequency may include: identifying a ratio of a size of the first non-overlapping region to a size of the rendering region; identifying whether the identified ratio is smaller than a first threshold; and based on identifying that the identified ratio is smaller than the first threshold, identifying the second rendering frequency as smaller than the first rendering frequency.

The method may include identifying a ratio of a size of the first non-overlapping region to a size of the rendering region; identifying whether the identified ratio is smaller than a second threshold; and based on identifying that the identified ratio is smaller than the second threshold, stopping rendering the rendering region.

Identifying the second rendering frequency may include, identifying the second rendering frequency, based on at least one of a ratio of a size of the first execution window to a size of a whole region of the display, a ratio of a size of the rendering region to the size of the whole region of the display, or a ratio of a size of a display region not displaying the first execution window and the second execution window to the size of the whole region of the display.

Identifying the second rendering frequency may include, identifying the second rendering frequency based on at least one of a transparency applied to the first execution window, a blur effect level applied to the first execution window, or a color of an edge of a user interface (UI) object of the first application displayed in the rendering region.

The display may be unfoldable or foldable by at least one or more hinges.

The electronic device may be a head mounted device (HMD) device, and controlling to display the first execution window and the second execution window may include controlling to display an image generated in a video-see-through manner on the display.

The method may include controlling to display a third execution window of a third application; obtaining a second user input to move the third execution window over the first execution window; based on obtaining the second user input, identifying whether the first execution window and the third execution window overlap at least in part; based on the first execution window and the third execution window overlapping at least in part, identifying a second non-overlapping region not obscured by the second execution window and the third execution window in the rendering region of the first execution window; identifying a third rendering frequency for displaying the visual object in the second non-overlapping region based on the identified second non-overlapping region and the rendering region; and controlling to display the visual object in the second non-overlapping region at the third rendering frequency.

The first execution window and the second execution window may be included in an execution list representing execution histories of applications executed on the electronic device.

A whole region of the display may be divided into a plurality of regions by multiple windows, wherein controlling to display the first execution window may include displaying the first execution window as one of the multiple windows, and wherein controlling to display the second execution window may include displaying the second execution window in a picture in picture (PIP) form or in a pop-up window form.

According to an aspect of the disclosure, there is provided an electronic device including: a display; a memory for storing instructions; and at least one processor, wherein the instructions, when executed by the at least one processor, cause the electronic device to: execute a first application and a second application; control to display a first execution window of the first application, and control to display a visual object related to a service provided by the first application at a first rendering frequency in a rendering region within the first execution window; control to display a second execution window of the second application, obtain a first user input for moving the second execution window over the first execution window; based on obtaining the first user input, identify whether the first execution window and the second execution window overlap at least in part; based on the first execution window and the second execution window overlapping at least in part, identify a second rendering frequency for displaying the visual object in a first non-overlapping region based on at least two of an overlapping region being obscured by the second execution window in the rendering region of the first execution window, the first non-overlapping region being not obscured by the second execution window in the rendering region of the first execution window, or the rendering region; and control to display the visual object in the first non-overlapping region at the second rendering frequency.

The instructions, when executed by the at least one processor, may cause the electronic device to: identify a ratio of a size of the first non-overlapping region to a size of the rendering region, identify whether the identified ratio is smaller than a first threshold, and based on identifying that the identified ratio is smaller than the first threshold, identify the second rendering frequency as a value smaller than the first rendering frequency.

The instructions, when executed by the at least one processor, may cause the electronic device to: identify a ratio of a size of the first non-overlapping region to a size of the rendering region, identify whether the identified ratio is smaller than a second threshold, and stop rendering the rendering region, based on identifying that the identified ratio is smaller than the second threshold.

The instructions, when executed by the at least one processor, may cause the electronic device to: identify the second rendering frequency, based on at least one of a ratio of a size of the first execution window to a size of a whole region of the display, a ratio of a size of the rendering region to the size of the whole region of the display, or a ratio of a size of a display region not displaying the first execution window and the second execution window to the size of the whole region of the display.

The instructions, when executed by the at least one processor, may cause the electronic device to: identify the second rendering frequency based on at least one of a transparency applied to the first execution window, a blur effect level applied to the first execution window, or a color of an edge of a user interface (UI) object of the first application displayed in the rendering region.

The display may be unfoldable or foldable by at least one or more hinges.

The electronic device may be a head mounted device (HMD) device, and the instructions, when executed by the at least one processor, may cause the electronic device to control to display an image generated in a video-see-through manner on the display.

The instructions, when executed by the at least one processor, may cause the electronic device to: control to display a third execution window of a third application; obtain a second user input for moving the third execution window over the first execution window; in response to receiving the second user input, identify whether the first execution window and the third execution window overlap at least in part; based on the first execution window and the third execution window overlapping at least in part, identify a second non-overlapping region not obscured by the second execution window and the third execution window in the rendering region of the first execution window, identify a third rendering frequency for displaying the visual object in the second non-overlapping region based on the identified second non-overlapping region and the rendering region; and control to display the visual object in the second non-overlapping region at the third rendering frequency.

The first execution window and the second execution window may be included in an execution list representing execution histories of applications executed on the electronic device.

A whole region of the display may be divided into a plurality of regions by multiple windows, and the instructions, when executed by the at least one processor, may cause the electronic device to: control to display the first execution window as one of the multiple windows, and control to display the second execution window in a picture in picture (PIP) form or in a pop-up window form.

BRIEF DESCRIPTION OF THE DRAWINGS

These and other features and/or aspects of the disclosure will become better understood when the following detailed description is read with reference to the accompanying drawings in which:

FIG. 9 is an example illustrating determining a second rendering frequency based on a ratio of a size of a first execution window to a size of an entire region of a display, or a ratio of a size of a rendering region to the size of the entire region of the display, in an electronic device according to an embodiment;

FIG. 11 is a flowchart of determining a second rendering frequency based on a size of various regions, in an electronic device according to an embodiment.

FIG. 12 is a flowchart of determining a second rendering frequency based on at least one of a transparency of a first execution window, a blur effect level applied to the first execution window, or a color of an edge of a user interface (UI) object of a first application displayed in a rendering region, in an electronic device according to an embodiment;

DETAILED DESCRIPTION

Figure 1:
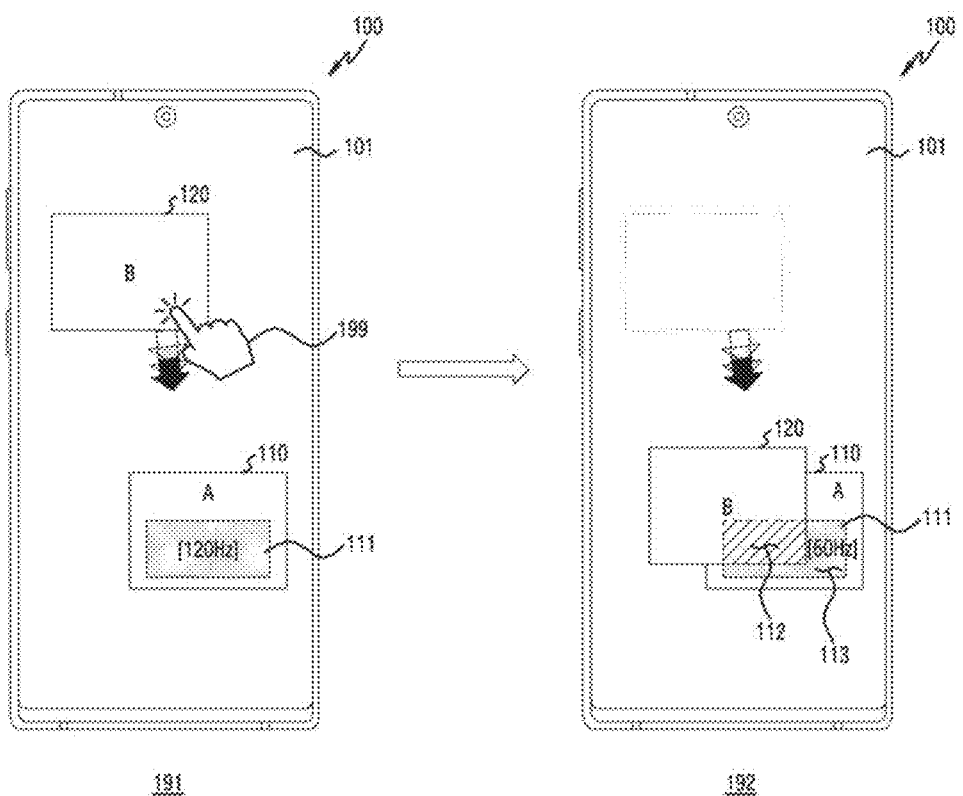
FIG. 1 is a diagram illustrating an overview of an electronic device for determining a rendering frequency for an application execution window obscured due to overlapping of execution windows of a plurality of applications according to an embodiment.

Below, one or more embodiments are described in detail with reference to the accompanying drawings to facilitate practice by those having ordinary knowledge in the art of the disclosure. However, the disclosed embodiment may be implemented in many different forms, and is not limited to embodiments described herein.

As an application rendering frequency for updating a frame presented on a display of an electronic device increases, use of a system resource (e.g., graphics processing unit (GPU), central processing unit (CPU), or random access memory (RAM) resource) and a battery may increase.

If execution windows of a plurality of applications displayed on the display of the electronic device are overlapped, even though a region obscured by the application overlay is rendered, an image of the obscured region may not be viewed to a user of the electronic device through a display panel. Thus, if an application including the rendering region obscured by the execution window of another application within its execution window maintains a high rendering frequency regardless of a size of the region obscured by the execution window of another application in the rendering region, unnecessary system resource and battery are wasted.

Various embodiments of the disclosure may provide an electronic device for preventing or reducing unnecessary system resource and battery waste, if a plurality of execution windows of applications displayed on the display of the electronic device overlap, and a method for determining a rendering frequency thereof.

An operating method of an electronic device according to an embodiment of the disclosure may include executing a first application and a second application; displaying a first execution window of the first application, and displaying a visual object related to a service provided by the first application at a first rendering frequency in a rendering region within the first execution window; displaying a second execution window of the second application; receiving (e.g., obtaining) a first user input to move the second execution window over the first execution window; in response to receiving the first user input, determining (e.g., identifying) whether the first execution window and the second execution window overlap at least in part; if the first execution window and the second execution window overlap at least in part, determining a second rendering frequency for displaying the visual object in a first non-overlapping region, based on at least two of an overlapping region obscured by the second execution window in the rendering region of the first execution window, the first non-overlapping region not obscured by the second execution window in the rendering region of the first execution window, or the rendering region; and displaying the visual object in the first non-overlapping region at the second rendering frequency.

In addition, determining the second rendering frequency may include calculating a ratio of a size of the first non-overlapping region to a size of the rendering region; determining whether the calculated ratio is smaller than a first threshold; and based on determining that the calculated ratio is smaller than the first threshold, determining the second rendering frequency to a value smaller than the first rendering frequency.

In addition, the method may include calculating a ratio of a size of the first non-overlapping region to a size of the rendering region; determining whether the calculated ratio is smaller than a second threshold; and based on determining that the calculated ratio is smaller than the second threshold, stopping rendering the rendering region.

In addition, determining the second rendering frequency may include determining the second rendering frequency, based on at least one of a ratio of a size of the first execution window to a size of a whole region of the display, a ratio of a size of the rendering region to the size of the whole region of the display, or a ratio of a size of the display region not displaying the first execution window and the second execution window to the size of the whole region of the display.

In addition, determining the second rendering frequency may include determining the second rendering frequency based on at least one of a transparency applied to the first execution window, a blur effect level applied to the first execution window, or a color of an edge of a user interface (UI) object of the first application displayed in the rendering region.

In addition, the display may be a display unfoldable or foldable by at least one or more hinges.

In addition, the electronic device may be a head mounted device (HMD) device, and displaying the execution windows may include displaying an image generated in a video-see-through manner on the display.

In addition, the method may further include displaying a third execution window of a third application; receiving a second user input to move the third execution window over the first execution window; in response to receiving the second user input, determining whether the first execution window and the third execution window overlap at least in part; if the first execution window and the third execution window overlap at least in part, identifying a second non-overlapping region not obscured by the second execution window and the third execution window in the rendering region of the first execution window; based on the identified second non-overlapping region and the rendering region, determining a third rendering frequency for displaying the visual object in the second non-overlapping region; and displaying the visual object in the second non-overlapping region at the third rendering frequency.

In addition, the first execution window and the second execution window may be included in an execution list representing execution histories of applications executed on the electronic device.

In addition, the whole region of the display may be divided into a plurality of regions by multiple windows, displaying the first execution window may include displaying the first execution window as one of the multiple windows, and displaying the second execution window may include displaying the second execution window in a picture in picture (PIP) form, or in a pop-up window form.

According to an embodiment of the disclosure, an electronic device may include a display; a memory for storing instructions; and at least one processor, and the instructions may, when executed by the at least one processor, cause the electronic device to: execute a first application and a second application, display a first execution window of the first application, and display a visual object related to a service provided by the first application at a first rendering frequency in a rendering region within the first execution window, display a second execution window of the second application, receive a first user input for moving the second execution window over the first execution window, in response to receiving the first user input, determine whether the first execution window and the second execution window overlap at least in part, if the first execution window and the second execution window overlap at least in part, determine a second rendering frequency for displaying the visual object in a first non-overlapping region, based on at least two of an overlapping region obscured by the second execution window in the rendering region of the first execution window, the first non-overlapping region not obscured by the second execution window in the rendering region of the first execution window, or the rendering region, and display the visual object in the first non-overlapping region at the second rendering frequency.

In addition, the instructions may, when executed by the at least one processor, cause the electronic device to: calculate a ratio of a size of the first non-overlapping region to a size of the rendering region, determine whether the calculated ratio is smaller than a first threshold, and based on determining that the calculated ratio is smaller than the first threshold, determine the second rendering frequency to a value smaller than the first rendering frequency.

In addition, the instructions may, when executed by the at least one processor, cause the electronic device to: calculate a ratio of a size of the first non-overlapping region to a size of the rendering region, determine whether the calculated ratio is smaller than a second threshold, and stop rendering the rendering region, based on determining that the calculated ratio is smaller than the second threshold.

In addition, the instructions may, when executed by the at least one processor, cause the electronic device to: determine the second rendering frequency, based on at least one of a ratio of a size of the first execution window to a size of a whole region of the display, a ratio of a size of the rendering region to the size of the whole region of the display, or a ratio of a size of the display region not displaying the first execution window and the second execution window to the size of the whole region of the display.

In addition, the instructions may, when executed by the at least one processor, cause the electronic device to: determine the second rendering frequency based on at least one of a transparency applied to the first execution window, a blur effect level applied to the first execution window, or a color of an edge of a UI object of the first application displayed in the rendering region.

In addition, the display may be a display unfoldable or foldable by at least one or more hinges.

In addition, the electronic device an HMD device, and the instructions may, when executed by the at least one processor, cause the electronic device to: display an image generated in a video-see-through manner on the display.

In addition, the instructions may, when executed by the at least one processor, cause the electronic device to: display a third execution window of a third application, receive a second user input for moving the third execution window over the first execution window, in response to receiving the second user input, determine whether the first execution window and the third execution window overlap at least in part, if the first execution window and the third execution window overlap at least in part, identify a second non-overlapping region not obscured by the second execution window and the third execution window in the rendering region of the first execution window, based on the second non-overlapping region and the rendering region, determine a third rendering frequency for displaying the visual object in the second non-overlapping region, and display the visual object in the second non-overlapping region at the third rendering frequency.

In addition, the first execution window and the second execution window may be included in an execution list representing execution histories of applications executed on the electronic device.

In addition, the whole region of the display may be divided into a plurality of regions by multiple windows, and the instructions may, when executed by the at least one processor, cause the electronic device to: display the first execution window as one of the multiple windows, and display the second execution window in a PIP form, or in a pop-up window form.

FIG. 1 is a diagram illustrating an overview of an electronic device for determining a rendering frequency for an application execution window obscured due to overlay of execution windows of a plurality of applications according to an embodiment.

Referring to FIG. 1, if determining that execution windows 110 and 120 of a plurality of applications A and B displayed on a display 101 overlap, an electronic device 100 according to an embodiment may determine a second rendering frequency (e.g., [60 Hz] of FIG. 1) for displaying a first non-overlapping region 113 not obscured by the second execution window 120 in a rendering region 111 of the first execution window 110 of the first application A obscured by the overlay of the second execution window 120 of the second application B, and display the first non-overlapping region 113 at the determined second rendering frequency (e.g., [60 Hz] of FIG. 1).

Referring to a reference numeral 191 in FIG. 1, according to an embodiment, the electronic device 100 may execute the plurality of applications A and B, and display the execution windows 110 and 120 of the plurality of applications A and B, but display the rendering region 111 within the execution window 110 of the application A at a predesignated first rendering frequency (e.g., [120 Hz]). The rendering frequency may be a frequency of generating image data in software by the application. The rendering frequency may be different from, for example, a refresh rate of a display panel for refreshing an output of the display panel. The rendering frequency may be, for example, a frequency corresponding to an interval (a frame rate) of generating an image frame. The rendering region 111 shall be described in more detail with reference to FIG. 3A through FIG. 4.

Referring to a reference numeral 192 in FIG. 1, according to an embodiment, the execution windows 110 and 120 of the plurality of applications A and B executed on the electronic device 100 and displayed on the display 101 may overlap at least in part, as the second execution window 120 is moved over the first execution window 110 by a first user input 199.

According to an embodiment, the electronic device 100 may determine the second rendering frequency (e.g., [60 Hz]) for displaying the first non-overlapping region 113 not obscured by the second execution window 120 in the rendering region 111, by considering various regions (e.g., the rendering region 111, the overlapping region 112 obscured by the execution window 120 of the other application, the first non-overlapping region 113 not obscured by the execution window 120 of the other application) on the display 101, information of a size of the display 101 and a size of the first execution window 110, and visual effect attributes (e.g., a transparency, a blur effect level, a color) of the first execution window 110.

According to an embodiment, the electronic device 100 may transmit a software synchronization signal (e.g., SW Vsync) corresponding to the determined second rendering frequency (e.g., [60 Hz] of FIG. 1) to the first application A, to display the first non-overlapping region 113 within the first execution window 110 of the first application A at the second rendering frequency (e.g., [60 Hz] of FIG. 1).

According to an embodiment, the electronic device 100 may be a device including the display 101. For example, it may be, but not limited to, a smartphone, a tablet personal computer (PC), a mobile phone, a personal digital assistant (PDA), a laptop, a media player, a wearable device worn by the user, a consumer electronics device or other mobile computing device.

Figure 2:
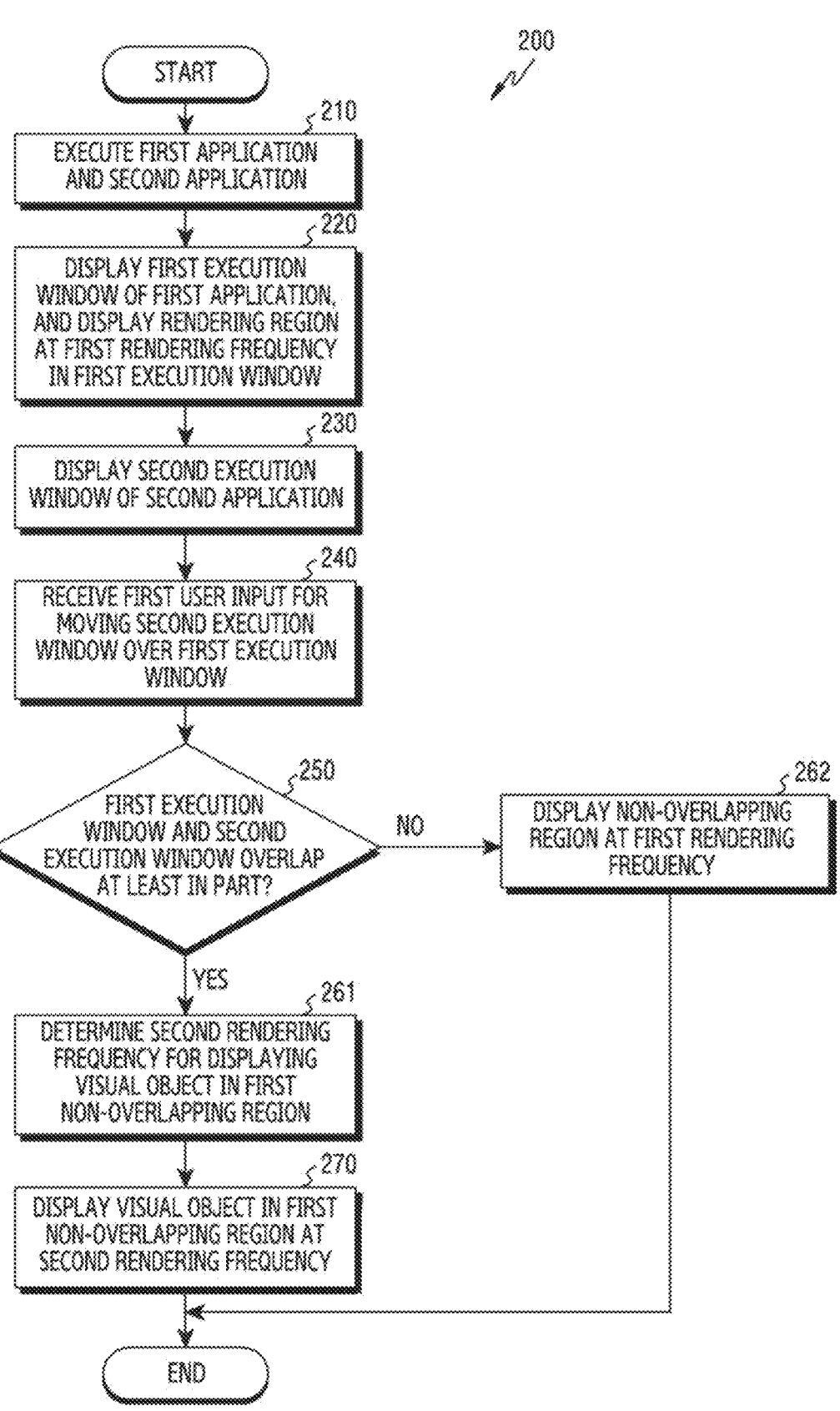
FIG. 2 is a flowchart of a method for an electronic device to determine a rendering frequency for an application execution window obscured due to overlapping of execution windows of a plurality of applications according to an embodiment.

FIG. 2 is a flowchart of a method for an electronic device to determine a rendering frequency for an application execution window obscured due to overlay of execution windows of a plurality of applications according to an embodiment.

In operation 210, the electronic device may execute a first application and a second application.

According to an embodiment, the electronic device 100 may receive a specific user input (e.g., a user input touching an icon of the first application on a home screen of the electronic device 100) from the user to execute the first application A, and execute the first application in response to the specific user input. According to an embodiment, the electronic device 100 may receive another specific user input (e.g., a user input touching an icon of the second application on the home screen of the electronic device 100) from the user to execute the second application, and execute the second application in response to the another specific user input. According to an embodiment, functionality provided to the user by the first application on the electronic device 100 may include a function for displaying dynamic visual objects on the display 101. For example, the first application may provide the user with a function for playing a video. For example, the first application may provide the user with a function for creating a document. For example, the first application may provide the user with a function for transmitting a message to a server (e.g., a server 1808 of FIG. 18) or an external electronic device (e.g., an electronic device 1802 of FIG. 18, an electronic device 1804 of FIG. 18) and receive a message from the server (e.g., the server 1808 of FIG. 18) or the external electronic device (e.g., the electronic device 1802 of FIG. 18, the electronic device 1804 of FIG. 18). For example, the first application may provide the user with a function for displaying an icon indicating a remaining battery capacity of the electronic device 100. For example, the first application may provide the user with a function for displaying a UI related to a text input of the user.

In operation 220, the electronic device may display a first execution window of the first application, and display a visual object related to a service provided by the first application at a first rendering frequency in the rendering region of the first execution window.

According to an embodiment, the visual object related to the service provided by the first application may be displayed within the first execution window 110.

In the electronic device 100 according to an embodiment, the visual object related to the service provided by the first application may include a dynamic image. For example, the visual object may be video content being played by a video playback application. For example, the visual object may be a character of game content displayed by a running game application. For example, the visual object may be a UI for receiving a text input from the user, in a messaging application.

According to an embodiment, the electronic device 100 may display the first execution window 110 in at least a part on the display 101. For example, the electronic device 100 may display the first execution window 110 on the whole region of the display 101. For example, the electronic device 100 may display the first execution window 110 in any one of a plurality of regions divided in the display 101. For example, the electronic device 100 may display the first execution window 110 in a pop-up form or a PIP form in a partial region of the regions of the display 101 in response to a preset user input.

According to an embodiment, the rendering region 111 within the first execution window 110 may be at least a part of the region of the first execution window 110. The rendering region 111 shall be described in more detail with reference to FIG. 3A through FIG. 4.

According to an embodiment, the electronic device 100 may preset and store in a memory, a first rendering frequency for displaying a visual object related to a service provided by the first application in the rendering region 111 of the first execution window 110 of the executed first application. According to an embodiment, the electronic device 100 may calculate the first rendering frequency as a value of a synchronization signal having a period corresponding to a maximum refresh rate of the display 101. For example, if the maximum refresh rate of the display 101 is 120 Hz, the electronic device 100 may calculate 7.33 ms which is a period corresponding to 120 Hz as the synchronization signal value. For example, if the maximum refresh rate of the display 101 is 60 Hz, the electronic device 100 may calculate 16.67 ms which is a period corresponding to 60 Hz as the synchronization signal value. According to an embodiment, the electronic device 100 may set the first rendering frequency based on the calculated synchronization signal value. For example, the electronic device 100 may set the first rendering frequency to 120 Hz, based on the calculated synchronization signal value which is 7.33 ms. For example, the electronic device 100 may set the first rendering frequency to 60 Hz, based on the calculated synchronization signal value of 16.67 ms.

In operation 230, the electronic device 100 may display a second execution window of the second application.

According to an embodiment, the second execution window 120 may display a visual object related to a service provided by the second application.

According to an embodiment, the electronic device 100 may display the second execution window 120 in at least a partial region on the display 101. For example, the electronic device 100 may display the second execution window 120 in a pop-up or PIP form in the partial region of the regions of the display 101, in response to a preset user input.

According to an embodiment, the electronic device 100 may display the second execution window 120 not to overlap the first execution window 110.

According to an embodiment, the electronic device 100 may display the second execution window 120 to overlap the first execution window 110.

In operation 240, the electronic device may receive a first user input for moving the second execution window over the first execution window.

According to an embodiment, the first user input may be a user input for overlapping the second execution window 120 with the first execution window 110, to display the second execution window 120 over the first execution window 110. For example, if the type of the second execution window 120 is the pop-up window type, the first user input may be a user input for touching and dragging the second execution window 120 displayed on the display 101 to move the second execution window 120 over the first execution window 110.

In the electronic device 100 according to an embodiment, the first user input may include a user input for adjusting the size of an exposed region of the display 101 of the electronic device 100. For example, if the electronic device 100 is a slidable electronic device including a first housing and a second housing, the first user input may be a user input for increasing or reducing the size of the exposed region of the display 101 by withdrawing or retracting a part of the second housing from the first housing. In this case, for example, as the size of the exposed region of the display 101 is expanded or reduced, the second execution window 120 may be moved over the first execution window 110. According to an embodiment, the electronic device 100 may control the display 101 to move the second execution window 120 in response to receiving the first user input. For example, if the first user input is a user input for touching and dragging the second execution window 120 and moving the second execution window 120 over the first execution window 110, the electronic device 100 may control the display 101 to move and display the second execution window 120 in response to the user's drag input. For example, if the electronic device 100 is a slidable electronic device, the electronic device 100 may, upon receiving the first user input for reducing the size of the exposed region of the display 101, control the display 101 to move at least one of the first execution window 110 or the second execution window 120 within the reduced region of the display 101 to place the second execution window 120 over the first execution window 110.

According to an embodiment, as the electronic device 100 moves the second execution window 120 in response to receiving the first user input for moving the second execution window 120 over the first execution window 110, the second execution window 120 and the first execution window 110 may overlap. For example, as the electronic device 100 controls the display 101 in response to receiving the first user input for touching and dragging the second execution window 120 to move the second execution window 120 over the first execution window 110, the second execution window 120 may be displayed to overlap the first execution window 110. For example, if the electronic device 100 is a slidable electronic device, as the size of the exposed region of the display 101 of the electronic device 100 is reduced in response to a user input for reducing the size of the exposed region of the display 101, the electronic device 100 may control positions for displaying the first execution window 110 and the second execution window 120 on the display 101, and thus the first execution window 110 and the second execution window 120 may be overlapped.

In operation 250, the electronic device may determine whether the first execution window and the second execution window overlap at least in part.

According to an embodiment, the electronic device 100 may determine whether the first execution window 110 and the second execution window 120 overlap at least in part, based on position information (or coordinate information) and/or size information of each of the first execution window 110 and the second execution window 120 on the display 101.

According to an embodiment, the position information (or the coordinate information) of the execution windows may be a data value corresponding to a specific position on the display 101.

Figure 18:
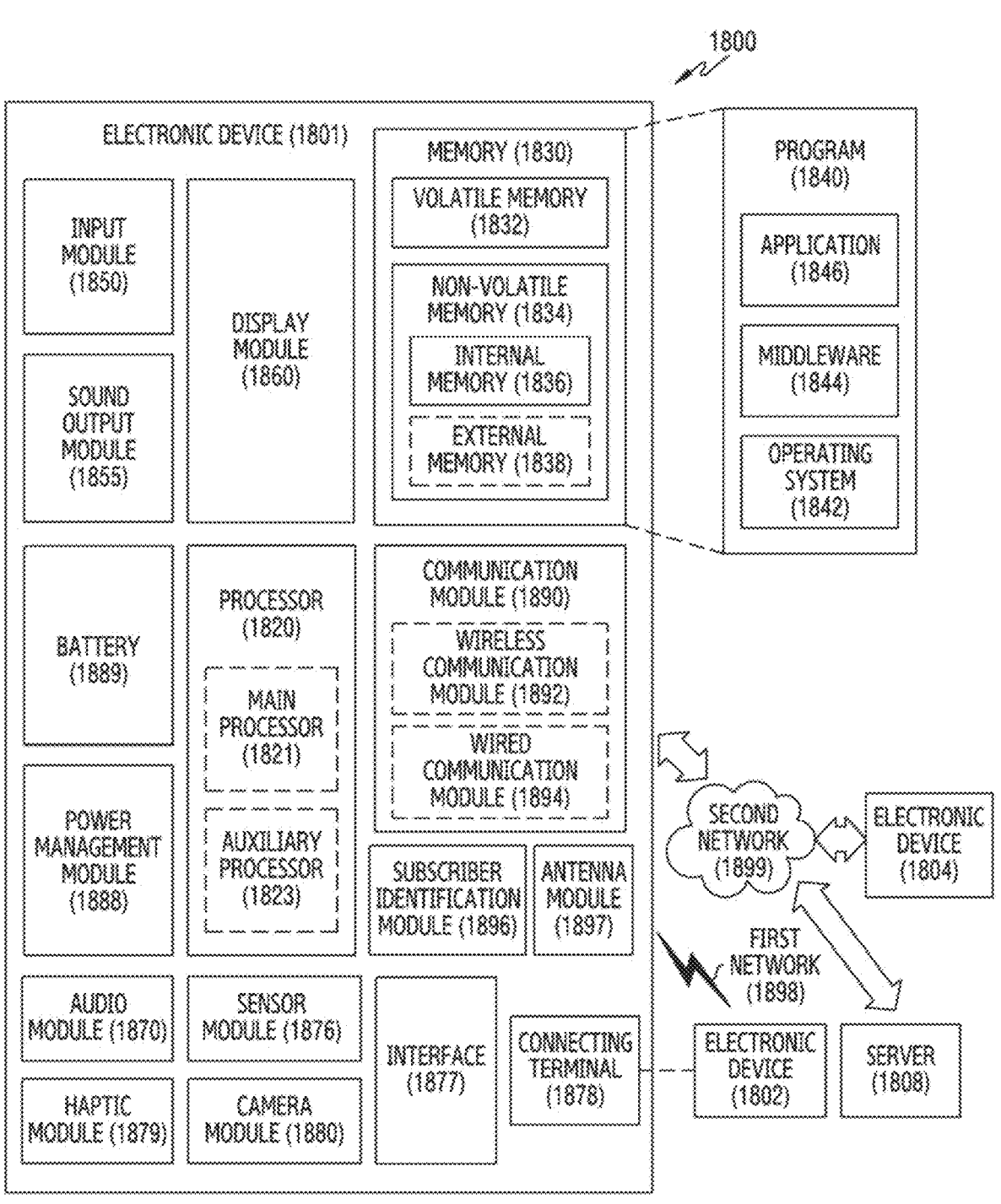
FIG. 18 is a block diagram of an electronic device in a networked environment, according to various embodiments.
Figure 19:
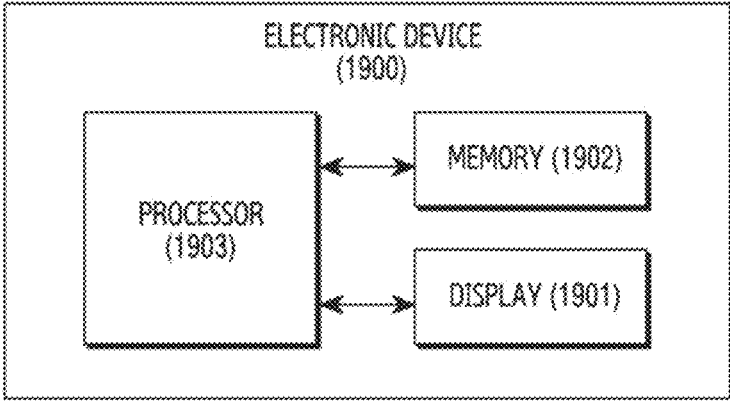
FIG. 19 is a block diagram of an electronic device according to an embodiment.

According to an embodiment, the electronic device 100 may prestore the position information (or the coordinate information) of the execution windows in a specific data format in the memory (e.g., a memory 1902 of FIG. 19). According to an embodiment, the electronic device 100 may prestore the position information (or the coordinate information) of the execution windows in a specific data format on the server (e.g., a server 1808 of FIG. 18) using a network (e.g., a second network 1899 of FIG. 18). For example, the data format of the position information of the execution windows stored in the memory 1902 of the electronic device 100 may be, but not limited to, a table format, an array format, or a list format.

According to an embodiment, upon receiving the first user input 199, if the second execution window 120 moves over the first execution window 110, the electronic device 100 may update a data value corresponding to the position information of the second execution window 120 stored in the memory 1902 in real time. According to an embodiment, if the second execution window 120 moves over the first execution window 110 in response to receiving the first user input 199, the electronic device 100 may transmit the data value corresponding to the position information of the second execution window 120 to the server (e.g., the server 1808 of FIG. 18) over the network (e.g., the second network 1899 of FIG. 18) in real time.

According to an embodiment, the electronic device 100 may identify area coordinates of the first execution window 110 and area coordinates of the second execution window 120 based on the data values corresponding to the position information of the first execution window 110 and the data values corresponding to the position information of the second execution window 120. According to an embodiment, based on the area coordinates of the first execution window 110 and the area coordinates of the second execution window 120, if the region of the first execution window 110 and the region of the second execution window 120 overlap at least in part, the electronic device 100 may determine that the first execution window 110 and the second execution window 120 overlap.

In operation 261, the electronic device may determine the second rendering frequency for displaying a visual object in the first non-overlapping region.

According to an embodiment, in response to determining in operation 250 that the first execution window 110 and the second execution window 120 overlap at least in part, the electronic device 100 may determine the second rendering frequency for displaying a visual object in the first non-overlapping region 113.

In the electronic device 100 according to an embodiment, the first non-overlapping region 113 may be a region not obscured by the second execution window 120 in the rendering region 111 of the first execution window 110. The electronic device 100 according to an embodiment may display at least one visual object of the first application in the first non-overlapping region 113.

According to an embodiment, the electronic device 100 may determine as the first non-overlapping region 113, a region excluding the overlapping region 112 obscured by the second execution window 120 in the rendering region 111 of the first execution window 110, in the rendering region 111.

According to an embodiment, the electronic device 100 may determine a second rendering frequency based on at least two of the rendering region 111, the overlapping region 112, and the first non-overlapping region 113. For example, the electronic device 100 may determine the second rendering frequency based on a ratio of the size of the first non-overlapping region 113 to the size of the rendering region 111. For example, the electronic device 100 may determine the second rendering frequency based on a ratio of the size of the overlapping region 112 to the size of the rendering region 111. For example, the electronic device 100 may determine the second rendering frequency based on a ratio of the size of the first non-overlapping region 113 to a sum of the size of the overlapping region 112 and the size of the first non-overlapping region 113. For example, the electronic device 100 may determine the second rendering frequency based on a ratio of the size of the overlapping region 112 to a sum of the size of the overlapping region 112 and the size of the first non-overlapping region 113.

According to an embodiment, determining the second rendering frequency at the electronic device 100 may be performed in software by a UI framework module of a processor 1903.

According to an embodiment, determining the second rendering frequency by the UI framework module of the processor 1903 of the electronic device 100 shall be described in detail with reference to FIG. 19.

Determining the second rendering frequency based on various information at the electronic device 100 shall be described in more detail with reference to FIG. 6, and FIG. 9 through FIG. 12.

In operation 262, the electronic device may display the visual object in the first non-overlapping region at the first rendering frequency.

According to an embodiment, upon determining in operation 250 that the first execution window 110 and the second execution window 120 do not overlap, the electronic device 100 may display the visual object in the first non-overlapping region 113 by maintaining the existing first rendering frequency for displaying the first execution window 110.

In operation 270, the electronic device may display the visual object in the first non-overlapping region at the second rendering frequency.

The electronic device 100 according to an embodiment may display a part of the visual object displayed in the first non-overlapping region 113 at the second rendering frequency in operation 262.

The electronic device 100 according to an embodiment may calculate a synchronization period corresponding to the second rendering frequency determined in operation 261. For example, if the second rendering frequency determined in operation 261 is 60 Hz, the electronic device 100 according to an embodiment may calculate 16.68 ms corresponding to 60 Hz as the synchronization period. For example, if the second rendering frequency determined in operation 261 is 30 Hz, the electronic device 100 according to an embodiment may calculate 33.34 ms corresponding to 30 Hz as the synchronization period.

According to an embodiment, the electronic device 100 may transmit the calculated synchronization period value to the first application, to thus control the first application to perform rendering at the second rendering frequency. For example, if the calculated synchronization period value is 16.68 ms, the electronic device 100 according to an embodiment may transmit the calculated synchronization period value of 16.68 ms to the first application, to thus cause the first application to render the visual object displayed in the first execution window at every rendering frequency (60 Hz) corresponding to 16.68 ms. For example, if the calculated synchronization period value is 33.34 ms, the electronic device 100 according to an embodiment may transmit the calculated synchronization period value of 33.34 ms to the first application, to thus cause the first application to render the visual object displayed in the first execution window at every rendering frequency (30 Hz) corresponding to 33.34 ms.

Finally displaying the visual object of the first application on the display according to the determined second rendering frequency at the electronic device 100 according to an embodiment will be described in detail with reference to FIG. 19.

Figure 3A:
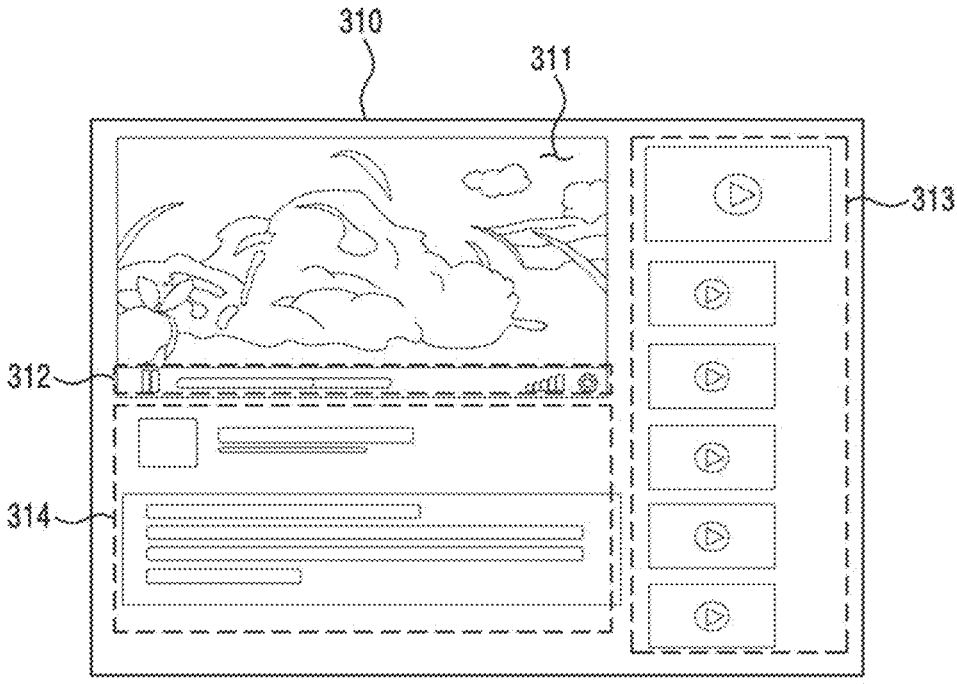
FIG. 3A is an example illustrating that a partial region within a first execution window of a first application running on an electronic device is a rendering region according to various embodiments of the disclosure.

FIG. 3A is an example illustrating that a partial region within a first execution window of a first application running on an electronic device is a rendering region according to various embodiments of the disclosure.

Referring to FIG. 3A, at least one visual object may be displayed in a first execution window (e.g., the first execution window 110 of FIG. 1, a first execution window 310 of FIG. 3A) of an application (e.g., an application 1846 of FIG. 18, the first application of FIG. 1) running on the electronic device (e.g., an electronic device 1900 of FIG. 19, the electronic device 100 of FIG. 1) according to an embodiment.

For example, referring to FIG. 3A, a video 311 playing in the first execution window 310, UI icons 312 positioned below the video 311 being played and allowing the user to control playback of the video 311, a list 313 of thumbnail images of videos listed on a right side of the execution window 310, and a UI 314 positioned below the video 311 and displaying texts related to information of the video 311 may be visual objects displayed in the first execution window 310.

In the electronic device (e.g., the electronic device 1900 of FIG. 19, the electronic device 100 of FIG. 1) according to an embodiment, a part of the visual objects may be a dynamic visual object (e.g., a dynamic image). For example, referring to FIG. 3A, the video 311 being played and positioned in an upper left corner of the first execution window 310 may be a dynamic image.

In the electronic device (e.g., the electronic device 1900 of FIG. 19, the electronic device 100 of FIG. 1) according to an embodiment, a part of the visual objects may be a static visual object (e.g., a static image). For example, referring to FIG. 3A, the UI icons 312, the list 313 of the thumbnail images of the videos listed on the right side of the first execution window 310, and the UI 314 among the visual objects may be static images.

In the electronic device (e.g., the electronic device 1900 of FIG. 19, the electronic device 100 of FIG. 1) according to an embodiment, rendering may be an operation in which the running application (e.g., the application 1846 of FIG. 18, the first application of FIG. 1) draws an image of a visual object under control of software.

In the electronic device (e.g., the electronic device 1900 of FIG. 19, the electronic device 100 of FIG. 1) according to an embodiment, a region displaying the dynamic visual object (e.g., the dynamic image) may be the rendering region 311. For example, referring to FIG. 3A, a view of the video being played may be the rendering region 311.

In the electronic device (e.g., the electronic device 1900 of FIG. 19, the electronic device 100 of FIG. 1) according to an embodiment, the region displaying the static visual object (e.g., the static image) may be a region other than the rendering region 311. For example, referring to FIG. 3A, the UI icons 312 positioned below the video being played and allowing the user to control the playback of the video, the list 313 of the thumbnail images of the videos listed on the right side of the first execution window 310, and the UI 314 positioned below the video and displaying the texts related to the video information among the visual objects may be regions other than the rendering region 311.

In the electronic device (e.g., the electronic device 1900 of FIG. 19, the electronic device 100 of FIG. 1) according to an embodiment, the rendering region 311 may be at least a partial region within the first execution window 310. For example, referring to FIG. 3A, the rendering region 311 displaying the played video may be a partial region of the first execution window 310.

According to an embodiment, in the electronic device (e.g., the electronic device 1900 of FIG. 19, the electronic device 100 of FIG. 1), the rendering region (e.g., the rendering region 111 of FIG. 1, the rendering region 311 of FIG. 3A) may be, for example, a region for continuously updating an image frame to be displayed on the display (e.g., the display 1901 of FIG. 19, the display 101 of FIG. 1) in the electronic device (e.g., the electronic device 1900 of FIG. 19, the electronic device 100 of FIG. 1).

For example, the rendering region may be a region for continuously updating and displaying image data of a visual object constructing a frame to be displayed on the display, in the region of the first execution window (e.g., the first execution window 110 of FIG. 1, the first execution window 310 of FIG. 3A) of the first application (e.g., the application 1846 of FIG. 18, the first application of FIG. 1) running on the electronic device (e.g., the electronic device 1900 of FIG. 19, the electronic device 100 of FIG. 1).

Figure 3B:
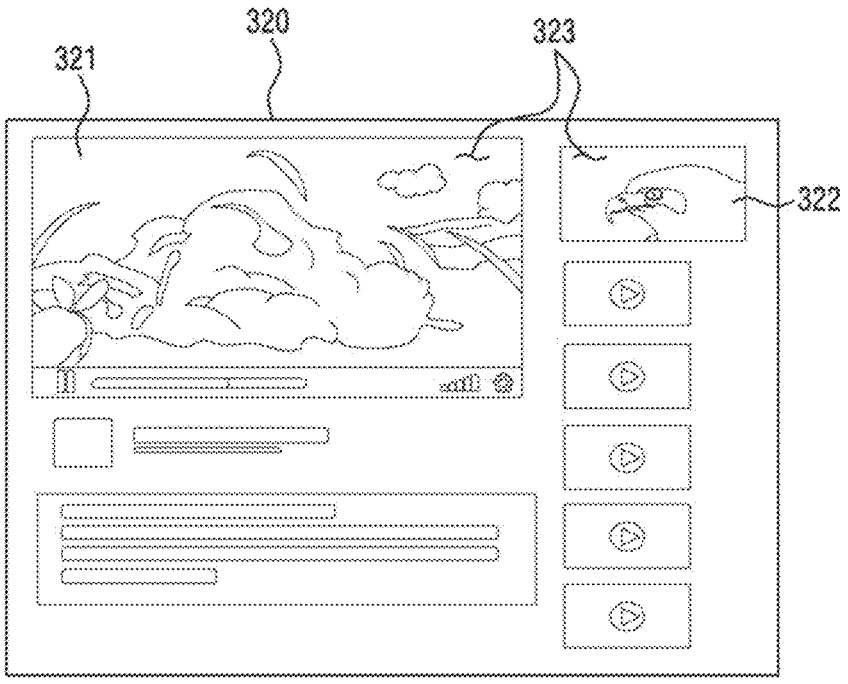
FIG. 3B is an example illustrating a plurality of separate rendering regions included in a first execution window according to an embodiment.

FIG. 3B is an example illustrating a plurality of separate rendering regions included in a first execution window according to an embodiment.

Referring to FIG. 3B, a first execution window 320 (e.g., the first execution window 110 of FIG. 1, the first execution window 310 of FIG. 3A) of the first application (e.g., the application 1846 of FIG. 18, the first application of FIG. 1) running on the electronic device (e.g., the electronic device 1900 of FIG. 19, the electronic device 100 of FIG. 1) according to an embodiment may include a plurality of separate rendering regions 323. For example, the plurality of separate rendering regions 323 may include a rendering region 321 for displaying the video being played by the first application and a rendering region 322 for playing a video corresponding to a thumbnail image selected from the list 313 of the thumbnail images.

Figure 3C:
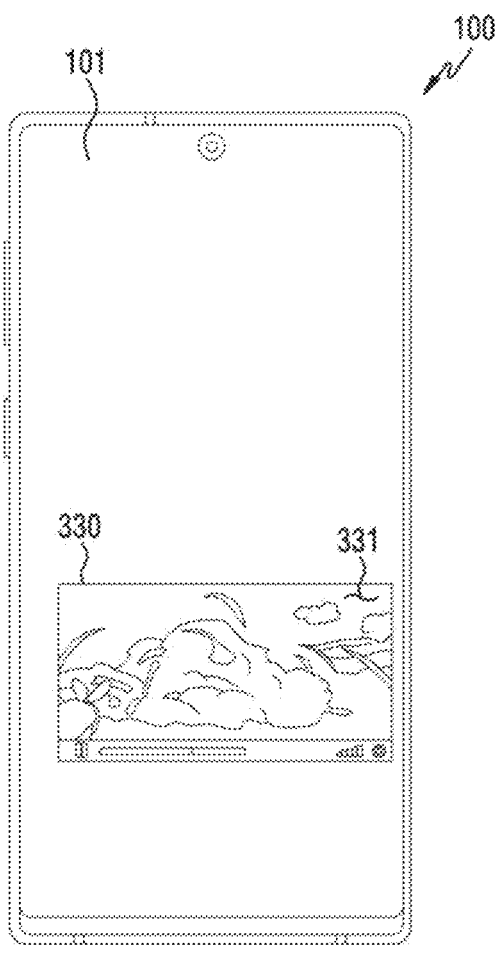
FIG. 3C is an example illustrating that the entire region of the first execution window of the first application running on the electronic device is the rendering region according to various embodiments of the disclosure.

FIG. 3C is an example illustrating that the entire region of the first execution window of the first application running on the electronic device is the rendering region according to various embodiments of the disclosure.

Referring to FIG. 3C, the entire region of a first execution window 330 (e.g., the first execution window 110 of FIG. 1) of the application (e.g., the application 1846 of FIG. 18, the first application of FIG. 1) running on the electronic device (e.g., the electronic device 1900 of FIG. 19, the electronic device 100 of FIG. 1) according to an embodiment may be a rendering region 331.

For example, the rendering region 331 may be the entire region of the first execution window 330, if the first execution window 330 is displayed in the PIP form or the pop-up window form.

Figure 4:
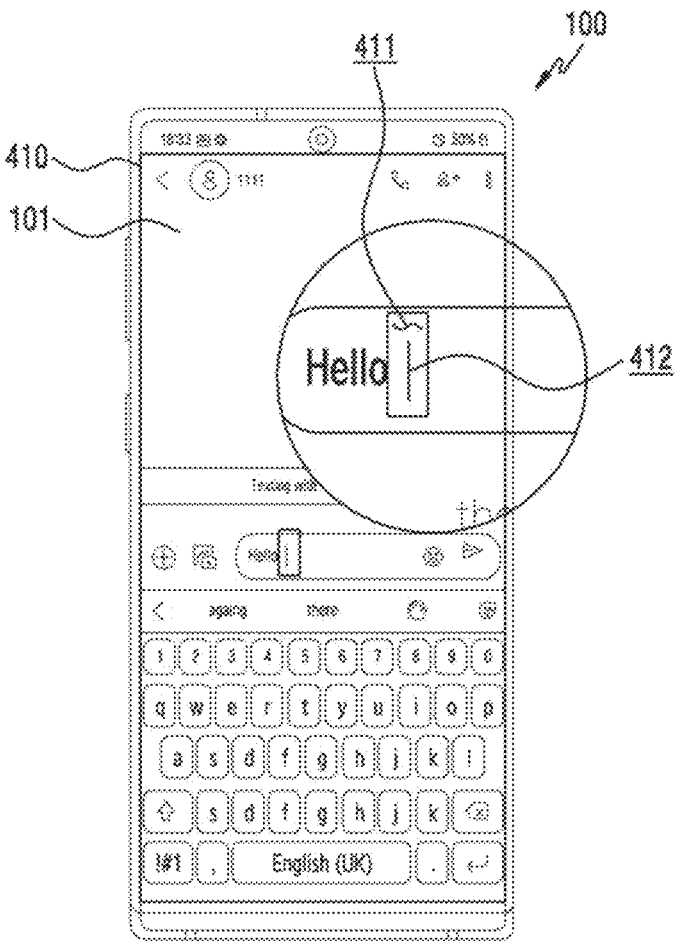
FIG. 4 is an example for illustrating a relationship between a rendering region of a first application running on an electronic device and a visual object of the first application according to various embodiments of the disclosure.

FIG. 4 is an example for illustrating a relationship between a rendering region of a first application running on an electronic device and a visual object of the first application according to various embodiments of the disclosure.

In the electronic device 100 according to an embodiment, a region displaying a dynamic visual object to be updated may be a rendering region within a first execution window 410.

In the electronic device 100 according to an embodiment, the visual object may be a UI component related to a service provided by the application. For example, referring to FIG. 4, in the execution window 410 of a message application, the visual object may include, but not limited to, a text input keyboard, texts inputted, an icon for receiving an input to display a screen for emoticon selection, a call button, and a cursor 412 indicating a text input position to the user.

In the electronic device 100 according to an embodiment, the dynamic visual objects to be updated may be automatically determined based on functionality provided by the application. For example, referring to FIG. 4, in the execution window 410 of the message application, the cursor 412 indicating the text input position to the user, which repeatedly disappears and reappears in the execution window at a regular frequency based on the functionality for providing the text input function, may be a visual object to be updated at a regular frequency.

In the electronic device 100 according to an embodiment, the dynamic visual object to be updated may be determined in response to receiving a specific user input at the electronic device 100. For example, referring to FIG. 4, in the execution window 410 of the message application, the text input keyboard may, in response to receiving a user touch input for a specific character at the electronic device 100, determine that it is necessary to update to apply a shading effect to the keyboard for the specific character input.

In the electronic device 100 according to an embodiment, the region displaying the dynamic visual object 412 to be updated may be a rendering region 411 within the first execution window 410.

The electronic device 100 according to an embodiment may store information related to a position and a size of the region displaying the visual object in the memory (e.g., a memory 1830 of FIG. 18, a memory 1902 of FIG. 19) of the electronic device 100. The electronic device 100 according to an embodiment may transmit the position and size information of the region displaying the visual object to the server (e.g., the server 1808 of FIG. 18) over the network (e.g., the second network 1899 of FIG. 18).

In the electronic device 100 according to an embodiment, the rendering region may be a set of regions of a plurality of dynamic visual objects. For example, in the electronic device 100 according to an embodiment, the rendering region may be a set of the region 411 displaying the cursor 412 indictive of the text input position to the user, and an icon indicative of a remining battery capacity.

Figure 5:
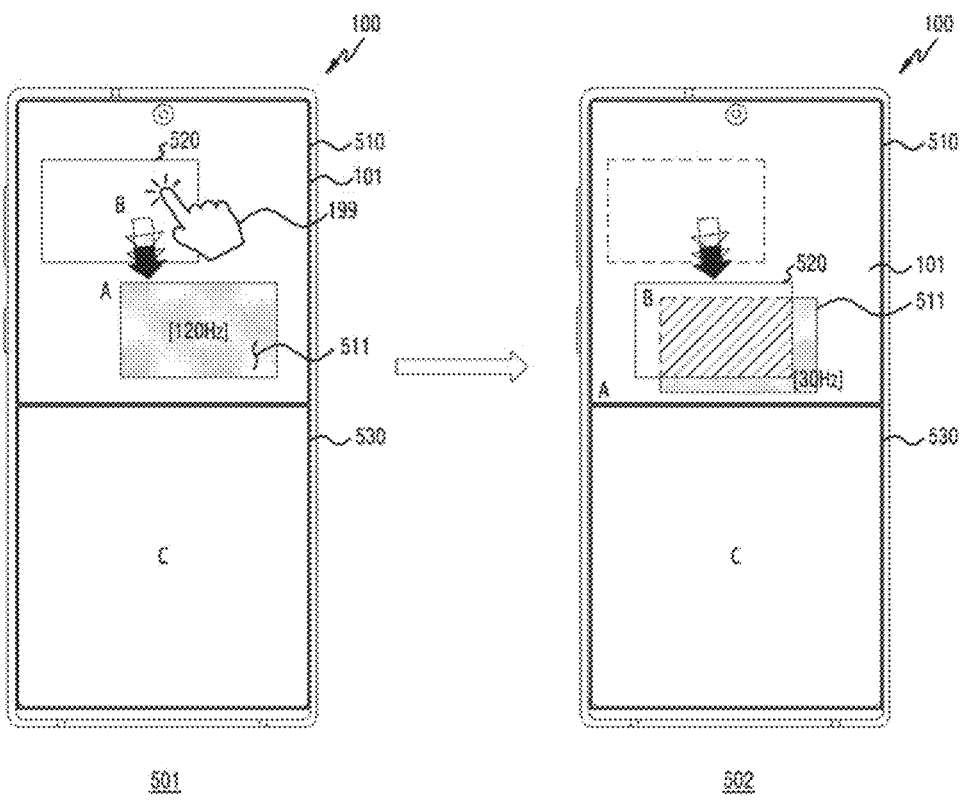
FIG. 5 is an example for illustrating a form of a first execution window and a second execution window in an electronic device according to an embodiment.

FIG. 5 is an example for illustrating a form of a first execution window and a second execution window in an electronic device according to an embodiment.

The electronic device 100 according to an embodiment, may display a first execution window 510 on multiple windows which divide the entire region of the display 101.

The electronic device 100 according to an embodiment may operate to display the execution windows of running applications on the display 101 in the multi-window form. For example, referring to FIG. 5, the electronic device 100 according to an embodiment may display the first execution window 510 of a first application and a third execution window 530 of a third application in the multi-window form which divides the entire region of the display 101.

The electronic device 100 according to an embodiment may display the execution windows of the running applications on the display 101 in the PIP form or the pop-up window form. For example, referring to a reference numeral 501 in FIG. 5, the electronic device 100 according to an embodiment may display a second execution window 520 in the PIP form or the pop-up window form, which is displayed in a specific region of the display 101.

The electronic device 100 according to an embodiment may receive a first user input for the second execution window 520 (e.g., the second execution window 120 of FIG. 1), and move the second execution window. For example, referring to the reference numeral 501 and a reference numeral 502 in FIG. 5, the first user input may be a user input for touching and dragging the region of the display 101 displaying the second execution window 520 and moving the second execution window 520 over a rendering region 511 of the first execution window 110.

FIG. 5 illustrate that, but not limited to, the first user input is the input for touching and dragging the region of the display 101 displaying the second execution window 520. For example, if the electronic device 100 is a slidable electronic device, the first user input may be a user input for expanding or reducing the size of the exposed region of the display 101.

Figure 6:
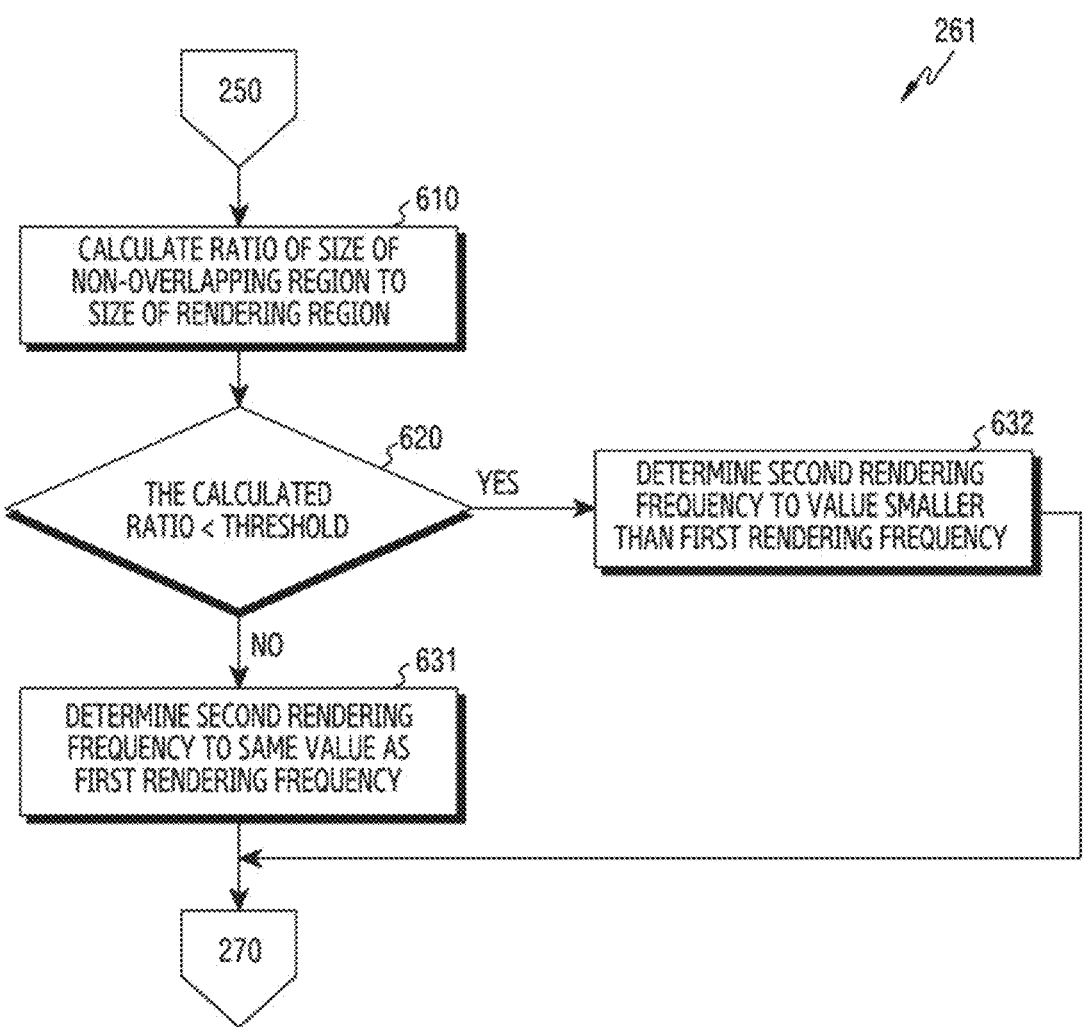
FIG. 6 is a flowchart of an electronic device for determining a second rendering frequency based on a ratio of a size of a first non-overlapping region to a size of a rendering region according to an embodiment.

FIG. 6 is a flowchart of a method for an electronic device to determine a second rendering frequency based on a size of a first non-overlapping region size to a size of a rendering region according to an embodiment.

According to an embodiment, operations 610 through 632 of FIG. 6 may correspond to operation 261 of FIG. 2.

In operation 610, the electronic device according to an embodiment may calculate a ratio of the size of the first non-overlapping region to the size of the rendering region.

According to an embodiment, the electronic device 100 may calculate the ratio of the size of the first non-overlapping region 113 to the size of the rendering region 111 based on at least two of the size of the rendering region 111 within the first execution window 110, the size of the first non-overlapping region 113 not obscured by the second execution window 120 in the rendering region 111, and the size of the overlapping region obscured by the second execution window 120 in the rendering region 111. For example, according to an embodiment, the electronic device 100 may calculate the ratio (e.g., 0.8) of the size of the first non-overlapping region 113 to the size of the rendering region 111 by subtracting a value (e.g., 0.2) produced by dividing the size of the overlapping region 112 by the size of the rendering region 111 from a value (e.g., 1) corresponding to the size of the rendering region 111. For example, according to an embodiment, the electronic device 100 may calculate the ratio (e.g., 0.8) of the size of the first non-overlapping region 113 to the size of the rendering region 111 by dividing the size of the first non-overlapping region 113 by the size of the rendering region 111. For example, according to an embodiment, the electronic device 100 may calculate the ratio (e.g., 0.8) of the size of the first non-overlapping region 113 to the size of the rendering region 111 by dividing the size of the first non-overlapping region 113 by a sum of the size of the overlapping region 112 and the size of the first non-overlapping region 113.

In operation 620, the electronic device according to an embodiment may determine whether the ratio calculated in operation 610 falls below a threshold.

According to an embodiment, the electronic device 100 may determine whether the ratio calculated in operation 610 fall below a preset threshold.

According to an embodiment, the electronic device 100 may preset and store the threshold in the memory 1902. For example, according to an embodiment, the electronic device 100 may set a first threshold to 0.5 and store it in the memory 1902. For example, according to an embodiment, the electronic device 100 may set a second threshold to 0.3 and store it in the memory 1902.

According to an embodiment, the threshold preset by the electronic device 100 may be determined through decision making and/or a heuristic test based on at least one of performance of a processor 1820 of the electronic device 100, a capacity of a battery 1889 of the electronic device 100, performance of the memory 1830 of the electronic device 100, service attributes provided by the application 1846 running on the electronic device 100, and the size of the display 101 of the electronic device 100. For example, if the performance of the processor 1820 of the electronic device 100 is relatively low, the electronic device 100 according to an embodiment may set the threshold higher than if the performance of the processor 1820 of the electronic device 100 is relatively high.

According to an embodiment, the threshold preset by the electronic device 100 may be adjusted based on an operating state of the electronic device 100. For example, if the electronic device 100 is a slidable electronic device, and the display 101 of the slidable electronic device is operated in an expanded state, the threshold may be set lower than if the display 101 is operated in a diminished state.

In operation 631, the electronic device according to an embodiment may determine the second rendering frequency based on determining that the ratio is above the threshold in operation 620.

According to an embodiment, based on determining in operation 620 that the ratio of the size of the first non-overlapping region 113 to the size of the rendering region 111 is above the threshold, the electronic device 100 may determine the second rendering frequency to the same value as the first rendering frequency, not to change the rendering frequency of the rendering region 111.

Although it is described that operation 631 determines the second rendering frequency, but not limited to, to the same value as the first rendering frequency, and it may be implemented with modification in a range for achieving the purpose. For example, according to an embodiment, based on determining in operation 620 that the ratio of the size of the first non-overlapping region 113 to the size of the rendering region 111 is above the threshold, the electronic device 100 may determine the second rendering frequency to a value smaller than the first rendering frequency. For example, according to an embodiment, based on determining in operation 620 that the ratio of the size of the first non-overlapping region 113 to the size of the rendering region 111 is above the threshold, the electronic device 100 may determine the second rendering frequency to a value greater than the first rendering frequency.

Based on determining in operation 620 that the ratio falls below the threshold, the electronic device according to an embodiment may determine the second rendering frequency to a value smaller than the first rendering frequency in operation 632.

According to an embodiment, the electronic device 100 may determine the second rendering frequency to a value smaller than the first rendering frequency, based on determining in operation 620 that the ratio of the size of the first non-overlapping region 113 to the size of the rendering region 111 falls below the threshold.

According to an embodiment, the second rendering frequency may be determined based on at least one of the performance of the processor 1820 of the electronic device 100, the capacity of the battery 1889 of the electronic device 100, the performance of the memory 1830 of the electronic device 100, the service attributes provided by the application 1846 running on the electronic device 100, or the size of the display 101 of the electronic device 100. For example, the second rendering frequency may be set during manufacturing of the electronic device 100 through decision making and/or a heuristic test.

For example, if the performance of the processor 1820 is low, the second rendering frequency may be set to be smaller if the performance of the processor 1820 is high.

For example, if the performance of the memory 1830 is low, the second rendering frequency may be set to be smaller than if the performance of the memory 1830 is high.

For example, if the capacity of the battery 1889 is low, the second rendering frequency may be set to be smaller than if the capacity of the battery 1889 is high.

For example, if the size of the display 101 to the size of the first execution window 110 and/or the size of the second execution window 120 of the electronic device 100 is smaller than the threshold, the electronic device 100 according to an embodiment may set the second rendering frequency to be smaller than if the size of the display 101 to the size of the first execution window 110 and/or the size of the second execution window 120 of the electronic device 100 is greater than the threshold. Hence, if the user uses both the first execution window 110 and the second execution window 120, and the size of the display 101 is relatively small such that the first execution window 110 and the second execution window 120 overlap in part, it is possible to prevent the second rendering frequency of the rendering region 111 within the first execution window 110 from being set unnecessarily small.

An example of determining the second rendering frequency based on the size of various regions will be described in more detail in FIG. 9 and FIG. 10B.

Figure 7:
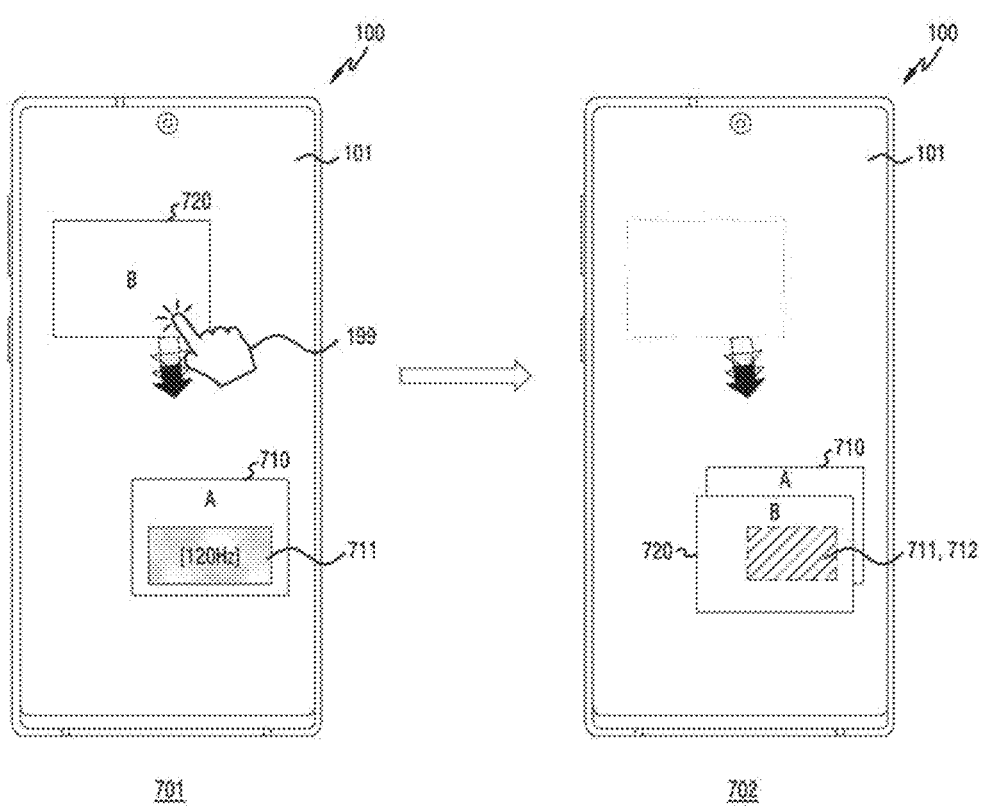
FIG. 7 is an example for illustrating stopping rendering a rendering region, in an electronic device according to an embodiment.

FIG. 7 is an example for illustrating stopping rendering a rendering region, in an electronic device according to an embodiment.

Referring to a reference numeral 701 in FIG. 7, the electronic device 100 according to an embodiment may move a second execution window 720 toward a first execution window 710 in response to receiving a first user input 199.

Referring to a reference numeral 702 in FIG. 7, as the electronic device 100 according to an embodiment moves the second execution window 720 toward the first execution window 710 in response to receiving the first user input 199, a rendering region 711 of the first execution window 710 may be entirely obscured by the second execution window 720.

Referring to the reference numeral 702 in FIG. 7, if the electronic device 100 according to an embodiment moves the second execution window 720 toward the first execution window 710 in response to receiving the first user input 199, and thus all of the rendering region 711 of the first execution window 710 is obscured by the second execution window 720, the rendering region 711 may correspond to an overlapping region 712.

Referring to the reference numeral 702 in FIG. 7, if the electronic device 100 according to an embodiment moves the second execution window 720 toward the first execution window 710 in response to receiving the first user input 199, and thus all of the rendering region 711 of the first execution window 710 is obscured by the second execution window 720, the electronic device 100 may stop rendering the rendering region 711. For example, in the electronic device 100 according to an embodiment, stopping rendering the rendering region 711 may include an operation of the processor 1901 of the electronic device 100 transmitting a preset signal to the first application to stop the rendering.

In the electronic device 100 according to an embodiment, while the reference numeral 702 of FIG. 7 represents that, but not limited to, the rendering region 711 is entirely obscured by the second execution window 720, the electronic device 100 according to an embodiment may stop rendering based on the size of the non-overlapping region, based on a preset threshold. For example, if the rendering region 711 is obscured by the second execution window 720, the electronic device 100 may stop rendering, based on determining that a ratio of the size of the non-overlapping region to the size of the rendering region 711 is smaller than the preset threshold.

Figure 8:
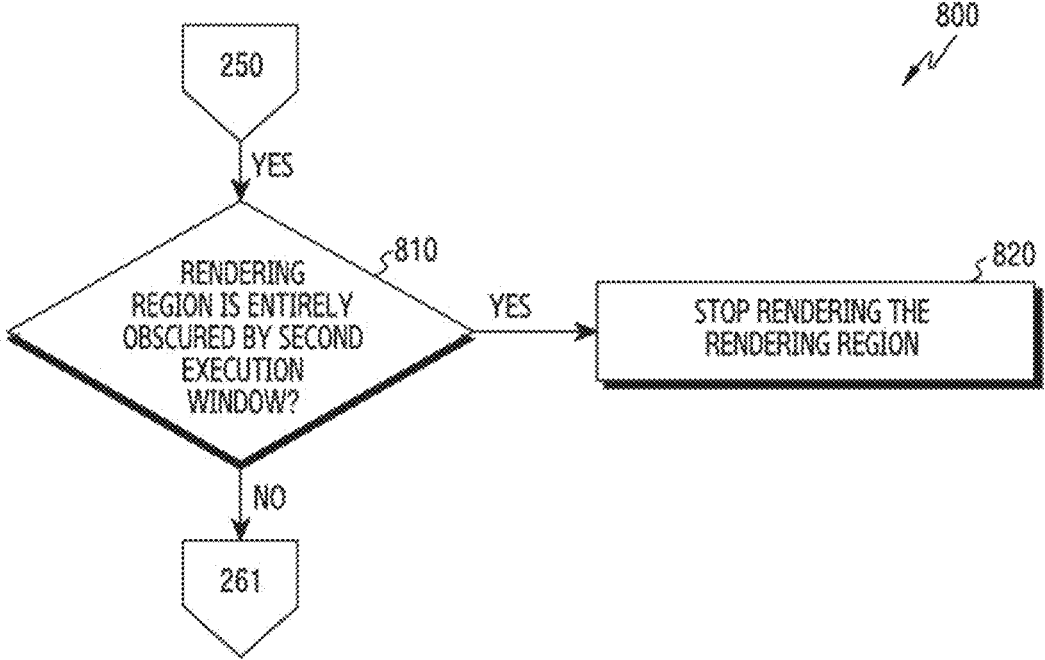
FIG. 8 is a flowchart of stopping rendering a rendering region, in an electronic device according to an embodiment.

FIG. 8 is a flowchart of stopping rendering a rendering region, in an electronic device according to an embodiment.

Operation 800 is to determine, in the electronic device 100 according to an embodiment, whether to stop rendering the rendering region 111 if the first execution window 110 is moved in response to receiving the first user input 199.

For example, operation 800 is described as being performed, but not limited to, after operation 250 of FIG. 2, and may be implemented with modification within a range for achieving the purpose.

In operation 810, the electronic device according to an embodiment may determine whether the rendering region is entirely obscured by the second execution window.

According to an embodiment, the electronic device 100 may identify data values corresponding to position information of the rendering region 711 and data values corresponding to position information of the second execution window 720 stored in the memory 1902. According to an embodiment, the electronic device 100 may identify area coordinates of the rendering region 711 and area coordinates of the second execution window 720 based on the identified data values corresponding to the position information. According to an embodiment, based on the identified area coordinates, the electronic device 100 may determine whether the rendering region 711 is entirely obscured by the second execution window 720.

In operation 820, the electronic device according to an embodiment may stop rendering the rendering region in response to determining in operation 810 that the rendering region is entirely obscured by the second execution window.

In an embodiment, based on determining in operation 810 that the rendering region 711 is entirely obscured by the second execution window 720, the electronic device 100 may stop rendering the rendering region 711 in operation 820. For example, if a video being played in the first application is entirely obscured by the second execution window 720, the electronic device 711 according to an embodiment may stop rendering the video of the first application.

FIG. 8 illustrates, but not limited to, that the electronic device 100 stops rendering the rendering region 711 if the rendering region 711 is entirely obscured by the second execution window 720. The electronic device 100 may stop rendering the rendering region 711, if the rendering region 711 is obscured by the second execution window 720 over a specific size.

FIG. 9 is an example illustrating determining a second rendering frequency based on a ratio of a size of a first execution window to a size of a whole region of a display, or a ratio of a size of a rendering region to the size of the whole region of the display, in an electronic device according to an embodiment.

Referring to a reference numeral 901 and a reference numeral 902 in FIG. 9, the electronic device 100 according to an embodiment may determine the second rendering frequency based on a ratio of the size of the first execution window 910 or the size of the rendering region 911 to the size of the whole region of the display 101.

For example, the electronic device 100 according to an embodiment may determine the second rendering frequency to the same value as the first rendering frequency, based on determining that the ratio of the size of the first execution window 910 or the size of the rendering region 911 to the size of the whole region of the display 101 is above a preset threshold.

For example, based on determining that the ratio of the size of the first execution window 910 or the size of the rendering region 911 to the size of the whole region of the display 101 is above the preset threshold, the electronic device 100 according to an embodiment may determine the second rendering frequency to a value greater than the first rendering frequency.

For example, as determining that the ratio of the size of the first execution window 910 or the size of the rendering region 911 to the size of the whole region of the display 101 is above the preset threshold, the electronic device 100 according to an embodiment may determine the second rendering frequency to a value smaller than the first rendering frequency.

For example, referring to the reference numeral 902 in FIG. 9, the electronic device 100 according to an embodiment may determine the second rendering frequency to a value smaller than the first rendering frequency, based on determining that the ratio of the size of the first execution window 910 or the size of the rendering region 911 to the size of the whole region of the display 101 falls below the preset threshold.

Figure 10A:
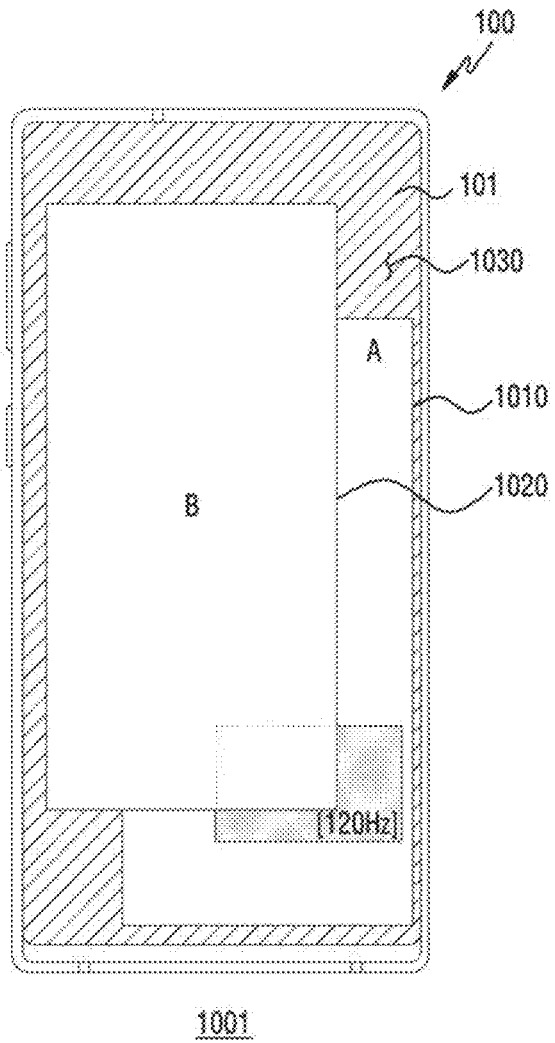
FIG. 10A is an example illustrating determining a second rendering frequency based on a size of a display region not displaying a first execution window and a second execution window, in an electronic device according to an embodiment.

FIG. 10A is an example illustrating determining a second rendering frequency based on a size of a display region not displaying a first execution window and a second execution window, in an electronic device according to an embodiment.

Referring to a reference numeral 1001 in FIG. 10A, the electronic device 100 according to an embodiment may determine the second rendering frequency to a value (e.g., 120 Hz) preset at the manufacturing phase of the electronic device, based on determining that a ratio of the size of a display region 1030 not displaying a first execution window 1010 and a second execution window 1020 to the size of the whole region of the display 101 falls below a preset threshold.

For example, the electronic device 100 according to an embodiment may determine the second rendering frequency to the same value as the first rendering frequency, based on determining that the ratio of the size of the display region 1030 not displaying the first execution window 1010 and the second execution window 1020 to the size of the whole region of the display 101 falls below the preset threshold.

FIG. 10A illustrates only that the electronic device 100 according to an embodiment determines the second rendering frequency to, but not limited to, the same value as the first rendering frequency. Even if determining that the ratio of the size of the display region 1030 not displaying the first execution window 1010 and the second execution window 1020 to the size of the whole region of the display 101 falls below the preset threshold, the second rendering frequency may be determined to a value smaller than the preset first rendering frequency. For example, based on determining that the ratio of the size of the display region 1030 not displaying the first execution window 1010 and the second execution window 1020 to the size of the whole region of the display 101 falls below the preset threshold, the electronic device 100 according to an embodiment may determine the second rendering frequency to a value (100 Hz) which is smaller than the first rendering frequency (e.g., 120 Hz).

The electronic device 100 according to an embodiment may determine whether to consider the ratio of the size of the display region 1030 not displaying the first execution window 1010 and the second execution window 1020 to the size of the whole region of the display 101 through decision making and/or a heuristic test based on at least one of the performance of the processor 1820 of the electronic device 100, the capacity of the battery 1889 of the electronic device 100, the performance of the memory 1830 of the electronic device 100, the service attributes provided by the application 1846 running on the electronic device 100, and the size of the display 101 of the electronic device 100.

Since the rendering region may overlap regardless of a user intention if an overlapping region are unavoidable due to size limitation of the display 101, the electronic device 100 may not unnecessarily lower the rendering frequency for the rendering region if the ratio of the size of the display region 1030 not displaying the first execution window 1010 and the second execution window 1020 to the size of the entire region of the display 101 is relatively small.

Figure 10B:
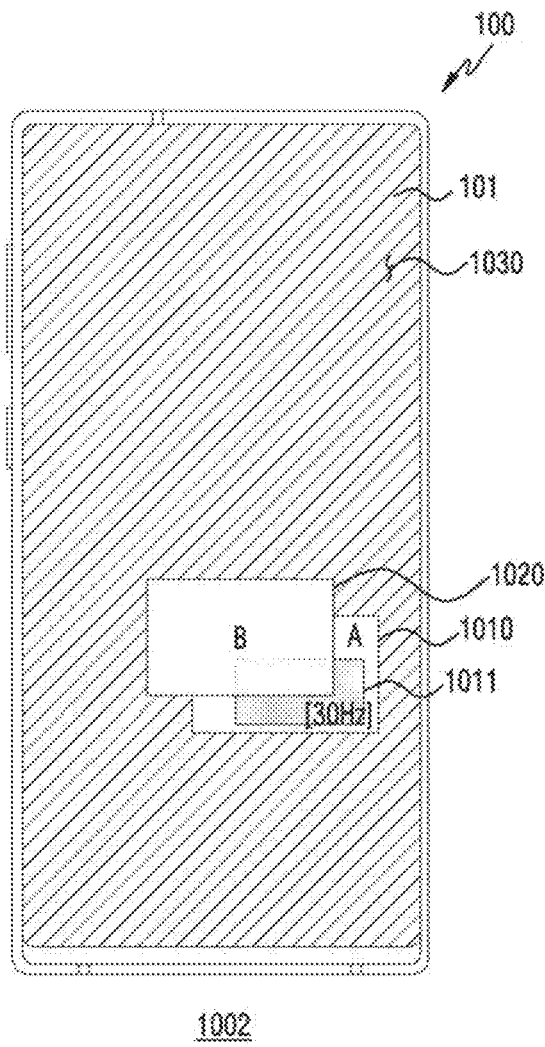
FIG. 10B is an example illustrating determining a second rendering frequency to a value smaller than the second rendering frequency based on a size of a display region not displaying a first execution window and a second execution window, in an electronic device according to an embodiment.

FIG. 10B is an example illustrating that the second rendering frequency is determined to a value smaller than the second rendering frequency based on the size of the display region not displaying the first execution window and the second execution window, in the electronic device according to an embodiment.

Referring to a reference numeral 1002 in FIG. 10B, based on determining that the ratio of the size of the display region 1030 not displaying the first execution window 1010 and the second execution window 1020 to the size of the whole region of the display 101 is above the preset threshold, the electronic device 100 according to an embodiment may determine the second rendering frequency to a value (e.g., 30 Hz) smaller than the first rendering frequency.

If the ratio of the size of the display region 1030 not displaying the first execution window 1010 and the second execution window 1020 to the size of the whole region of the display 101 is relatively great, a rendering region 1011 may be overlapped based on the user intention though the occurrence of the overlapping regions is not unavoidable due to the size limitation of the display 101, and accordingly the electronic device 100 may automatically lower the rendering frequency for the rendering region 1011 to prevent or reduce system resource and battery waste of the electronic device 100.

FIG. 11 is a flowchart for determining a second rendering frequency based on a size of various regions, in an electronic device according to an embodiment.

Operation 1110 through operation 1150 may correspond to operation 261 of FIG. 2.

In operation 1110, the electronic device according to an embodiment may calculate (e.g., identify) the ratio of the size of the non-overlapping region to the size of the rendering region. In the electronic device 100 according to an embodiment, operation 1110 may correspond to operation 610 of FIG. 6.

In operation 1120, the electronic device 100 according to an embodiment may calculate the ratio of the size of the first execution window to the size of the whole region of the display. For example, referring to the reference numeral 901 in FIG. 9, if the video being played in the first execution window 910 is displayed on the entire screen of the display 101, the electronic device 100 according to an embodiment may calculate the ratio of the size of the first execution window to the size of the whole region of the display 101 as 1.

For example, referring to the reference numeral 902 in FIG. 9, if the video being played in the first execution window 910 is displayed in a partial region of the display 101, the electronic device 100 according to an embodiment may calculate the ratio of the size of the first execution window 910 to the size of the whole region of the display 101 as a value smaller than 1.

If the electronic device 100 according to an embodiment is a slidable electronic device, and if the size of the entire exposed region of the display 101 changes, the ratio of the size of the first execution window 110 to the size of the entire exposed region of the display 101 may change. For example, if the electronic device 100 is the slidable electronic device, the ratio of the size of the first execution window 110 to the size of the entire exposed region of the display 101 may decrease as the exposed region of the display 101 expands. For example, if the electronic device 100 is the slidable electronic device, the ratio of the size of the first execution window 110 to the size of the whole exposed region of the display 101 may increase as the exposed region of the display 101 reduces. In operation 1130, the electronic device according to an embodiment may calculate the ratio of the size of the rendering region to the size of the whole region of the display.

For example, referring to the reference numeral 901 in FIG. 9, if the video being played in the first execution window 910 is displayed on the entire screen of the display 101, the electronic device 100 according to an embodiment may calculate the ratio of the size of the rendering region 911 to the size of the entire region of the display 101 as 1.

For example, referring to the reference numeral 902 in FIG. 9, if the video being played in the first execution window 910 is displayed in a partial region of the display 101, the electronic device 100 according to an embodiment may calculate the ratio of the size of the rendering region 911 to the size of the entire region of the display 101 as a value smaller than one.

If the electronic device 100 according to an embodiment is the slidable electronic device, and the size of the whole exposed region of the display 101 changes in the electronic device 100, the ratio of the size of the rendering region 111 to the size of the whole exposed region of the display 101 may change. For example, if the electronic device 100 is the slidable electronic device, the ratio of the size of the rendering region 111 to the size of the whole exposed region of the display 101 may decrease as the exposed region of the display 101 expands. For example, if the electronic device 100 is the slidable electronic device, the ratio of the size of the rendering region 111 to the size of the entire exposed region of the display 101 may increase as the exposed region of the display 101 reduces.

In operation 1140, the electronic device according to an embodiment may calculate the ratio of the size of the display region displaying neither the first execution window nor the second execution window to the size of the whole region of the display.

For example, referring to FIG. 10A and FIG. 10B, the electronic device 100 according to an embodiment may calculate the ratio by dividing the size of the display region 1030 not displaying neither the first execution window nor the second execution window by the size of the whole region of the display 101.

If the electronic device 100 according to an embodiment is the slidable electronic device and the size of the whole exposed region of the display 101 of the electronic device 100 changes, the ratio of the size of the region displaying neither the first execution window 110 nor the second execution window 120 to the size of the whole exposed region of the display 101 may change. For example, if the electronic device 100 is the slidable electronic device, the ratio of the size of the region displaying neither the first execution window 110 nor the second execution window 120 to the size of the entire exposed region of the display 101 may increase as the exposed region of the display 101 expands. For example, if the electronic device 100 is the slidable electronic device, the ratio of the size of the region displaying neither the first execution window 110 nor the second execution window 120 to the size of the entire exposed region of the display 101 may decrease as the exposed region of the display 101 reduces.

In operation 1150, the electronic device according to an embodiment may determine the second rendering frequency based on at least one of the ratios calculated in operation 1110 through operation 1140.

For example, although the ratio of the size of the first non-overlapping region 113 to the size of the rendering region 111 calculated in operation 1110 is greater than the preset first threshold, if the ratio of the size of the first execution window 110 to the size of the whole region of the display 101 calculated in operation 1120 is smaller than the preset second threshold, the electronic device 100 according to an embodiment may determine the second rendering frequency to a value (e.g., 60 Hz) lower than the first rendering frequency (e.g., 120 Hz).

For example, although the ratio of the size of the first non-overlapping region 113 to the size of the rendering region 111 calculated in operation 1110 is greater than the preset first threshold, if the ratio of the size of the rendering region 111 to the size of the whole region of the display 101 calculated in operation 1130 is smaller than a preset third threshold, the electronic device 100 according to an embodiment may determine the second rendering frequency to a value (e.g., 60 Hz) lower than the first rendering frequency (e.g., 120 Hz).

For example, although the ratio of the size of the first non-overlapping region 113 to the size of the rendering region 111 calculated in operation 1110 is greater than the preset first threshold, if the ratio of the size of the display region 1130 displaying neither the first execution window 110 nor the second execution window 120 to the size of the whole region of the display 101 calculated in operation 1140 is greater than a preset fourth threshold, the electronic device 100 according to an embodiment may determine the second rendering frequency to a value (e.g., 60 Hz) lower than the first rendering frequency (e.g., 120 Hz). In the electronic device 100 according to an embodiment, the method of considering the ratio calculated in operation 1110 through operation 1140 in determining the second rendering frequency in operation 1150 is not limited to the above examples, and at least one or more of operation 1110 through operation 1140 may be omitted or altered.

FIG. 12 is a flowchart for determining a second rendering frequency based on at least one of a transparency of a first execution window, a blur effect level applied to the first execution window, or a color of an edge of a UI object of a first application displayed in a rendering region, in an electronic device according to an embodiment.

Operation 1210 through operation 1250 may correspond to operation 261 of FIG. 2.

In operation 1210, the electronic device according to an embodiment may calculate the ratio of the size of the non-overlapping region to the size of the rendering region. In the electronic device 100 according to an embodiment, operation 1210 may correspond to operation 610 of FIG. 6 or operation 1110 of FIG. 11.

In operation 1220, the electronic device according to an embodiment may identify the transparency of the first execution window.

A transparency value within a preset range may be applied to the first execution window 110 of the first application running on the electronic device 100 according to an embodiment. For example, the preset transparency value in the electronic device 100 may range from 0% to 100% or more. For example, the transparency value of 50% may be applied to the first execution window 110. For example, the first execution window 110 may be displayed with the transparency value of 100% applied.

The electronic device 100 according to an embodiment may project and display a visual object regardless of the first application, in the region displaying the first execution window 110, based on the transparency value applied to the first execution window 110 of the first application. For example, if the transparency value applied to the first execution window 110 is 50%, the electronic device 100 may project and display a part of the home screen of the electronic device 100, on a part of the region displaying the first execution window 110.

Depending on the transparency value applied to the first execution window 110 of the electronic device 100 according to an embodiment, user's visibility for the visual object within the first execution window 110 may be determined. For example, if the transparency value applied to the first execution window 110 is 100%, the visual object in the first execution window 110 may be invisible to the user. For example, if the transparency value applied to the first execution window 110 is 70%, the user's visibility for the visual object in the first execution window 110 may be relatively lower than the user's visibility for the visual object within the first execution window 110 if the transparency value is 20%.

The electronic device 100 according to an embodiment may display a UI for receiving a user input to adjust the transparency, within the first execution window 110. For example, the electronic device 100 may display an icon in the form of a bar for adjusting the transparency of the first execution window 110 within the first execution window 110. For example, the electronic device 100 may display in the first execution window 110 buttons for selecting the transparency value to be applied to the first execution window 110.

The electronic device 100 according to an embodiment may adjust the transparency of the first execution window 110 in response to receiving a preset user input for adjusting the transparency of the first execution window 110. For example, if the preset user input for adjusting the transparency of the first execution window 110 is an input for adjusting the transparency of the first execution window 110 to 100%, the first execution window 110 may be invisible to the user even though the first execution window 110 does not overlap with the second execution window 120. The electronic device 100 according to an embodiment may receive from the memory 1902 a value relating to the transparency applied to the first execution window 110.

Operation 1220 describes, but not limited to, the transparency of the first execution window 110. The transparency value within a preset range may be applied to the second execution window 120 of the second application running on the electronic device 100.

For example, the transparency value of 50% may be applied to the second execution window 120. For example, the second execution window 120 may be displayed with the transparency value of 100% applied.

For example, if the transparency value applied to the second execution window 120 is 100%, the electronic device 100 may project and display a part of the first execution window 110, in the overlapping region 112 which overlaps the first execution window 110 in the region displaying the second execution window 120.

For example, if the transparency value applied to the second execution window 120 is 100%, the visual object within the second execution window 120 may be invisible to the user. For example, if the transparency value applied to the second execution window 120 is 70%, the user's visibility for the visual object within the second execution window 120 may be relatively lower than the user's visibility for the visual object within the second execution window 120 if the transparency value is 20%.

For example, the electronic device 100 may display an icon in the form of a bar for adjusting the transparency of the second execution window 120 within the second execution window 120.

For example, the electronic device 100 may display within the second execution window 120 buttons for selecting the transparency value to be applied to the second execution window 120.

For example, if the preset user input for adjusting the transparency of the second execution window 120 is an input for adjusting the transparency of the second execution window 120 to 100% and the second execution window 120 overlaps the first execution window 110, the overlapping region 112 of the first execution window 110 may be projected into a part of the region displaying the second execution window 120 and viewed to the user.

For example, the electronic device 100 according to an embodiment may receive from the memory 1902 a value relating to the transparency applied to the second execution window 120.

In operation 1230, the electronic device according to an embodiment may identify a blur effect level applied to the first execution window.

The electronic device 100 according to an embodiment may apply the blur effect to the first execution window 110 in response to receiving a preset user input for applying the blur effect to the first execution window 110. For example, in response to receiving touch and downward drag inputs of the user on a wallpaper in the home screen of the electronic device 100, the electronic device 100 according to an embodiment may execute an application for displaying icons of recommended applications, and apply the blur effect to the first execution window.

The electronic device 100 according to an embodiment may receive from the memory 1902 a value relating to the blur effect level applied to the first execution window 110.

In operation 1240, the electronic device according to an embodiment may identify similarity between a color of an UI object displayed in the rendering region and the color of the edge of the UI object.

For example, the electronic device 100 according to an embodiment may measure the similarity of color extraction values of sides forming the edges respectively of the UI object displayed in the rendering region 111 using a hue, saturation, and value (HSV) color table.

For example, if the similarity of the color extraction values of the sides forming the edges respectively of the UI object displayed in the rendering region 111 are all similar, the electronic device 100 according to an embodiment may select the HSV color table for measuring the similarity of the color extraction value of the UI object displayed in the rendering region 111 and the color extraction values of the sides forming the edges respectively of the UI object displayed.

For example, based on the selected HSV color table, the electronic device 100 according to an embodiment may identify the similarity of the color extraction values of the UI object displayed in the rendering region 111 and the color extraction values of the sides forming the edges respectively of the UI object.

The electronic device 100 according to an embodiment may receive from the memory 1902 data relating to the color extraction value of the UI object displayed in the rendering region 111 and the color extraction values of the sides forming the edges respectively of the UI object displayed in the rendering region 111.

In operation 1250, the electronic device according to an embodiment may determine the second rendering frequency based on the ratio calculated in operation 1210, and at least one of the values identified in operation 1220 through operation 1240.

For example, though the ratio of the size of the first non-overlapping region 113 to the size of the rendering region 111 calculated in operation 1210 is greater than the preset first threshold, if the transparency of the first execution window 110 identified in operation 1220 is greater than the preset second threshold, the electronic device 100 according to an embodiment may determine that the user's visibility for the visual object within the first execution window 110 is relatively low, and thus determine the second rendering frequency to a value (e.g., 60 Hz) lower than the first rendering frequency (e.g., 120 Hz).

If the transparency value applied to the second execution window 120 is greater than the preset third threshold, the electronic device 100 according to an embodiment may set the criterion for adjusting the second rendering frequency differently from a case when the transparency value applied to the second execution window 120 is smaller than or equal to the preset third threshold. For example, though the ratio of the size of the first non-overlapping region 113 to the size of the rendering region 111 calculated in operation 1210 is smaller than the preset first threshold, if the transparency value applied to the second execution window 120 is greater than the preset third threshold, the electronic device 100 may determine that the overlapping region 112 of the first execution window 110 is projected onto a part of the region displaying the second execution window 120 and viewed to the user, and thus determine the second rendering frequency to a greater value (e.g., 80 Hz) than the value (e.g., 60 Hz) of the second rendering frequency determined if the transparency value applied to the second execution window 120 is smaller than the preset third threshold. For example, though the ratio of the size of the first non-overlapping region 113 to the size of the rendering region 111 calculated in operation 1210 is greater than the preset first threshold, if the blur effect level applied to the first execution window identified in operation 1230 is greater than the preset fourth threshold, the electronic device 100 according to an embodiment may determine the second rendering frequency as a value (e.g., 60 Hz) lower than the first rendering frequency (e.g., 120 Hz).

For example, though the ratio of the size of the first non-overlapping region 113 to the size of the rendering region 111 calculated in operation 1210 is greater than the preset first threshold, if the similarity of the color of the UI object displayed in the rendering region identified in operation 1240 and the color of the edge of the UI object is greater than a preset fifth threshold, the electronic device 100 according to an embodiment may determine the second rendering frequency to a value (e.g., 60 Hz) lower than the first rendering frequency (e.g., 120 Hz).

In the electronic device 100 according to an embodiment, in determining the second rendering frequency in operation 1250, the method of considering the attributes related to the first execution window 110 of the first application identified in operation 1210 through operation 1240 is not limited to the above examples, and at least one or more of the operation 1210 through operation 1240 may be omitted or altered and other operation may be added.

Figure 13:
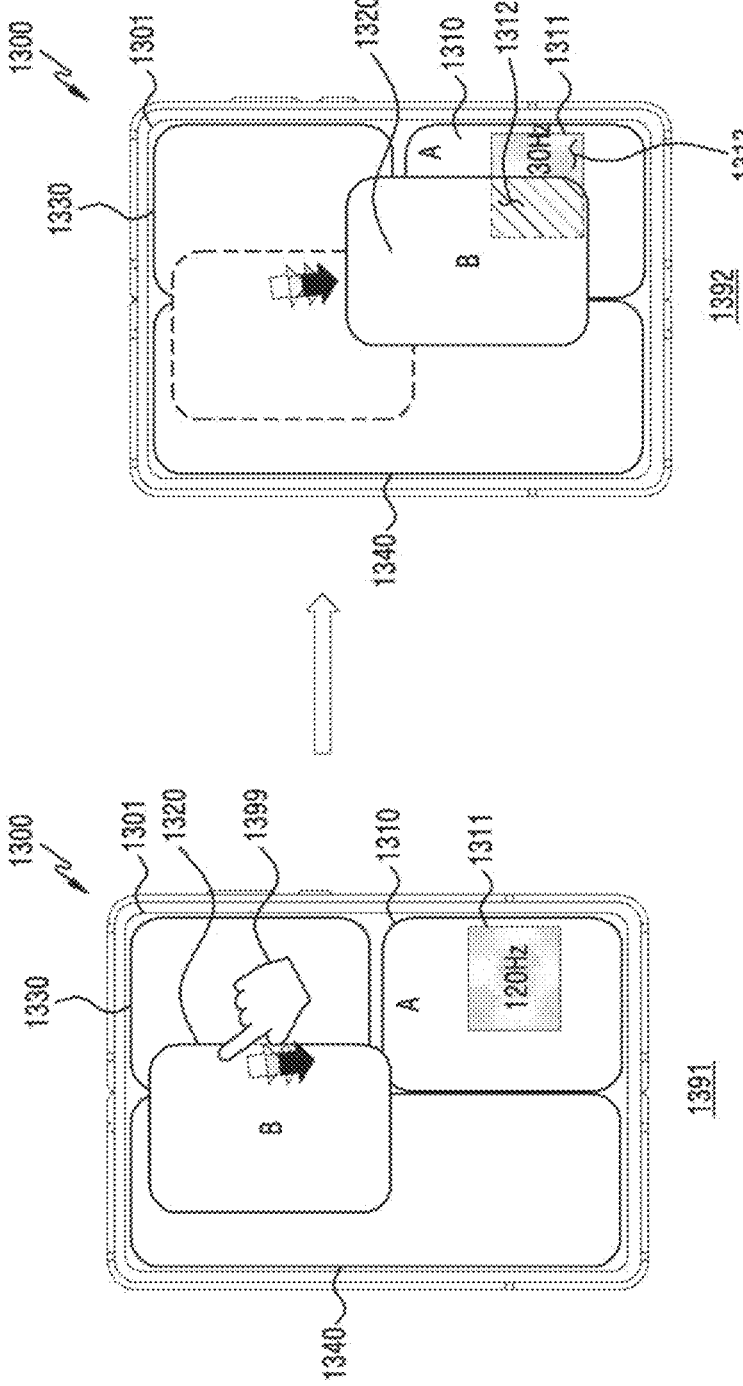
FIG. 13 is an example illustrating determining a second rendering frequency if an electronic device is a foldable electronic device including a foldable display according to an embodiment.

FIG. 13 is an example illustrating determining a second rendering frequency if an electronic device is a foldable electronic device including a foldable display according to an embodiment.

Referring to a reference numeral 1391 and a reference numeral 1392 in FIG. 13, a foldable electronic device 1300 according to an embodiment may include a foldable display 1301 which may be folded or unfolded by at least one hinge.

The foldable electronic device 1300 according to an embodiment may operate the foldable display 1301 to display split windows, while the foldable display 1301 is unfolded. For example, with the foldable display 1301 unfolded, the foldable electronic device 1300 according to an embodiment may display a first execution window 1310 of a first application, in a lower right region of a plurality of window regions which divide a region of the foldable display 1301. For example, with the foldable display 1301 unfolded, the foldable electronic device 1300 according to an embodiment may display a third execution window 1330 of a third application, in an upper right region of the plurality of window regions dividing the region of the foldable display 1301. For example, with the foldable display 1301 unfolded, the foldable electronic device 1300 according to an embodiment may display a fourth execution window 1340 of a fourth application, in a left region of the plurality of window regions dividing the region of the foldable display 1301.

With the foldable display 1301 unfolded, the foldable electronic device 1300 according to an embodiment may display a second execution window 1320 of a second application in the form of a pop-up window. For example, the foldable electronic device 1300 according to an embodiment may display the second execution window 1320 to be biased to the top left of the foldable display 1301.

The foldable electronic device 1300 according to an embodiment may receive a user input 1399 for moving the second execution window 1320. For example, referring to the reference numeral 1391 in FIG. 13, the electronic device 1300 according to an embodiment may move the second execution window 1320 toward the first execution window 1310 in response to receiving the user input 1399 for moving the second execution window 1320 over the first execution window 1310.

In response to receiving the user input 1399 for moving the second execution window 1320 over the first execution window 1310, the foldable electronic device 1300 according to an embodiment may determine whether the first execution window 1310 and the second execution window 1320 overlap at least in part.

In response to receiving the user input 1399 for moving the second execution window 1320 over the first execution window 1310, if the first execution window 1310 and the second execution window 1320 are overlapped at least in part, the foldable electronic device 1300 according to an embodiment may determine a second rendering frequency (e.g., [30 Hz]) for displaying a first non-overlapping region 1313 based on at least two of a rendering region 1311, an overlapping region 1312, and the first non-overlapping region 1313.

The foldable electronic device 1300 of FIG. 13 may correspond to the electronic device 100 of FIG. 1.

Figure 14:
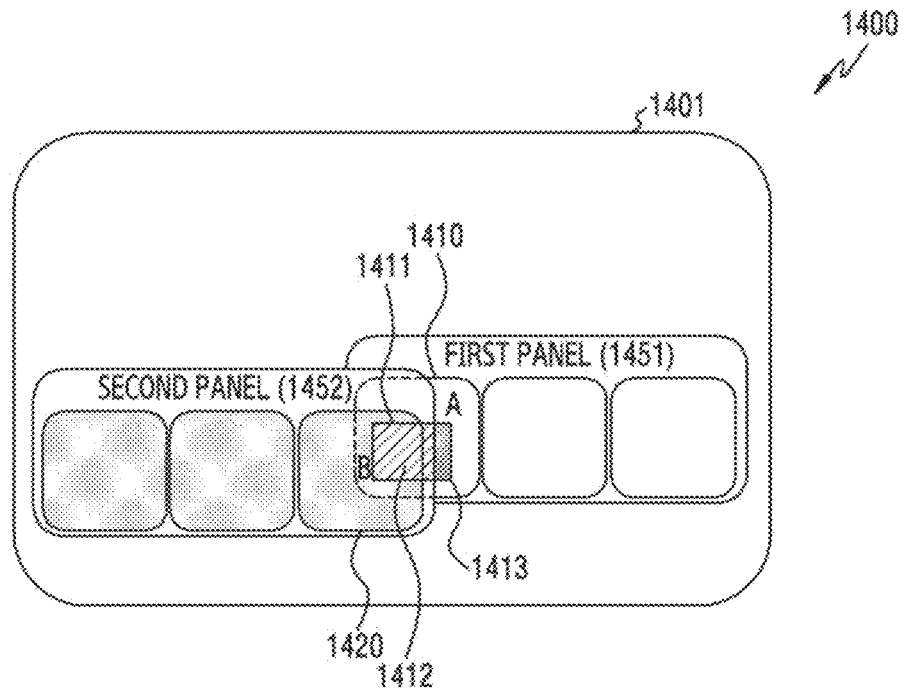
FIG. 14 is an example illustrating determining a second rendering frequency to display an image generated in a video-see-through manner on a display if an electronic device is a head mounted device (HMD) according to an embodiment.

Determining the second rendering frequency at the foldable electronic device 1300 of FIG. 13 may correspond to at least one of operation 200 of FIG. 2, operation 610 through operation 632 of FIG. 6, operation 800 of FIG. 8, operation 1110 through operation 1150 of FIG. 11, or operation 1210 through operation 1250 of FIG. 12. FIG. 14 is an example illustrating determining a second rendering frequency to display an image generated in a video-see-through manner on a display if an electronic device is an HMD according to an embodiment.

An electronic device 1400 according to an embodiment may be an HMD device. For example, the electronic device 1400 may be a device for displaying images with virtual reality (VR) technology applied. For example, the electronic device 1400 may be a device for displaying images with augmented reality (AR) technology applied.

The electronic device 1400 according to an embodiment may display images generated by the electronic device 1400 on the display in the video-see-through manner. For example, the electronic device 1400 may synthesize and display an image inputted through a camera module 1880 and a virtual image generated in the electronic device 1400.

Referring to a reference numeral 1400 in FIG. 14, the electronic device 1400 according to an embodiment may display on a display 1401 a plurality of panels 1451 and 1452 for displaying execution windows of a plurality of applications running in the background. For example, the first panel 1451 and the second panel 1452 each may include a plurality of regions divided in the same size.

Referring to the reference numeral 1400 in FIG. 14, in the electronic device 1400 according to an embodiment, the first panel 1451 may be overlapped and obscured by the second panel 1452. For example, the second panel 1452 may be moved over the first panel 1451, such that the first execution window 1410 of a first application displayed in the first panel 1451 and the second execution window 1420 of a second application displayed in the second panel 1452 may be overlapped at least in part.

If the first execution window 1410 of the first application displayed in the first panel 1451 and the second execution window 1420 of the second application displayed in the second panel 1452 overlap at least in part, the electronic device 1400 according to an embodiment may determine a second rendering frequency for displaying a first non-overlapping region 1413 not obscured by the second execution window 1420 in the rendering region 1411 of the first execution window 1410 displayed in the first panel 1451.

The electronic device 1400 of FIG. 14 may correspond to the electronic device 100 of FIG. 1.

Determining the second rendering frequency at the electronic device 1400 of FIG. 14 may correspond to at least one of operation 200 of FIG. 2, operation 610 through operation 632 of FIG. 6, operation 800 of FIG. 8, operation 1110 through operation 1150 of FIG. 11, or operation 1210 through operation 1250 of FIG. 12.

Figure 15:
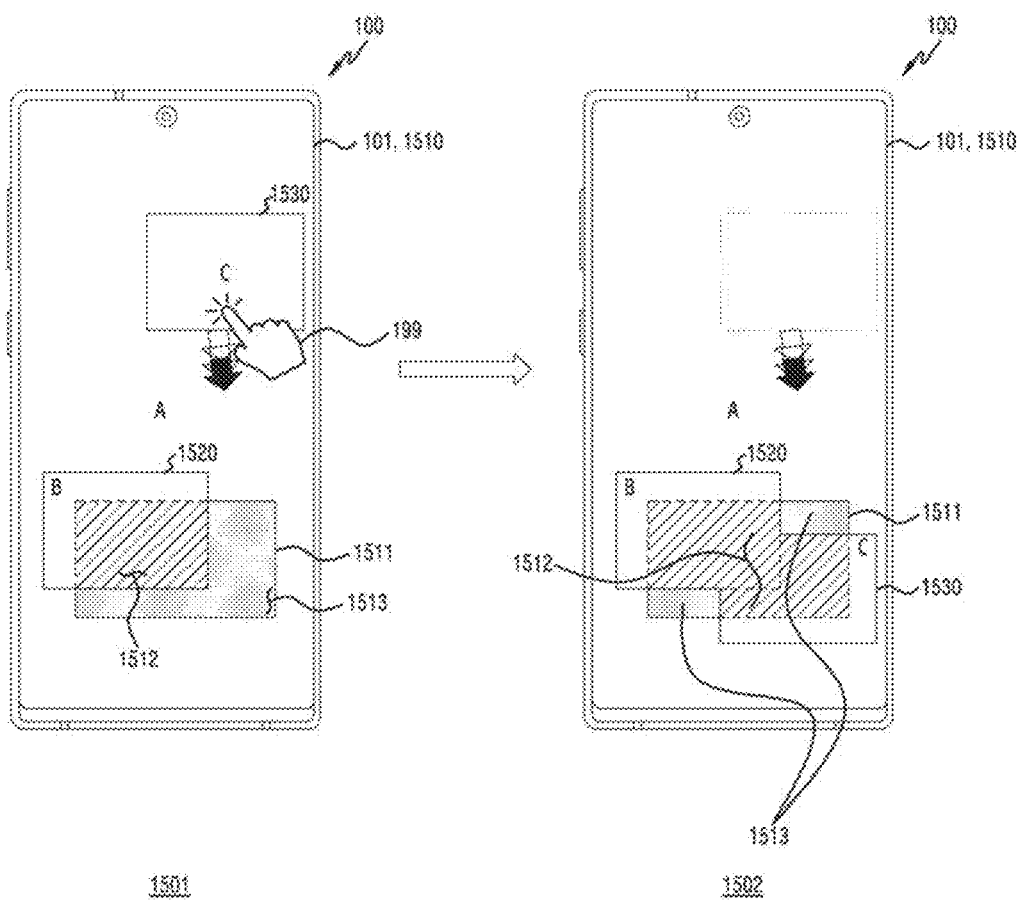
FIG. 15 is an example illustrating determining a third rendering frequency to display a visual object of a first application in a second non-overlapping region if execution windows of three or more applications are overlapped in an electronic device according to an embodiment.

FIG. 15 is an example illustrating determining a third rendering frequency for displaying a visual object of a first application in a second non-overlapping region if execution windows of three or more applications are overlapped in an electronic device according to an embodiment.

In FIG. 15, a first execution window 1510 may correspond to the first execution window 110 of FIG. 1. A second execution window 1520 in FIG. 15 may correspond to the second execution window 120 of FIG. 1. A reference numeral 1501 of FIG. 15 may correspond to the reference numeral 192 of FIG. 1.

Referring to FIG. 15, if determining that the execution windows 1510, 1520, and 1530 of a plurality of applications displayed on the display 101 overlap, the electronic device 100 according to an embodiment may determine the third rendering frequency for displaying a second non-overlapping region 1513 not obscured by the second execution window 1520 and the third execution window 1530 in a rendering region 1511 within the first execution window 1510 of the first application obscured at the bottom, and display the second non-overlapping region 1513 at the determined second rendering frequency.

Determining the third rendering frequency at the electronic device 100 according to an embodiment shall be described in detail with reference to FIG. 16.

Figure 16:
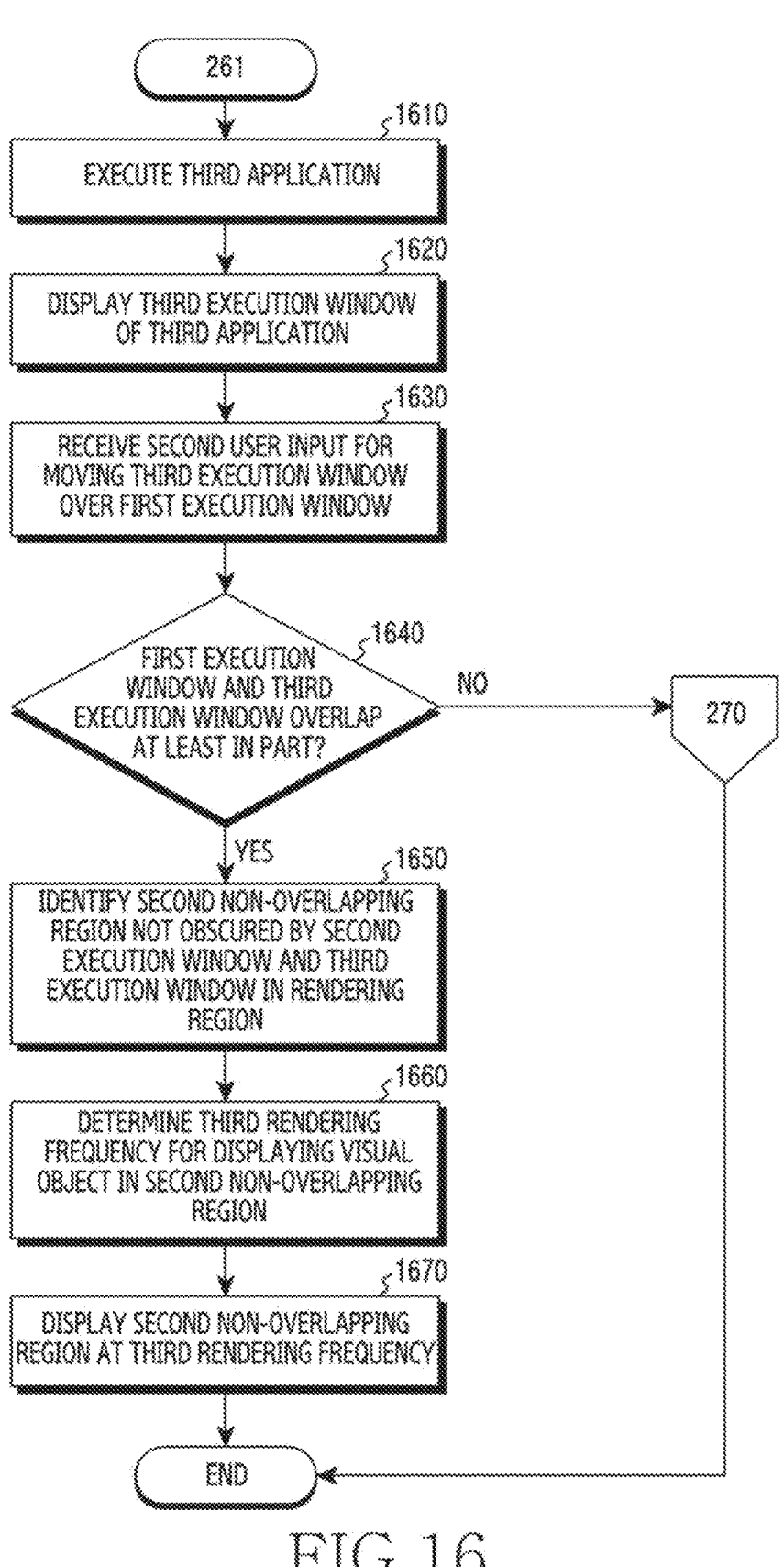
FIG. 16 is a flowchart of determining a third rendering frequency for displaying a visual object of a first application in a second non-overlapping region if execution windows of three or more applications are overlapped in an electronic device according to an embodiment.

FIG. 16 is a flowchart of determining a third rendering frequency for displaying a visual object of a first application in a second non-overlapping region if execution windows of three or more applications are overlapped in an electronic device according to an embodiment.

In operation 1610, the electronic device (e.g., the electronic device 100 of FIG. 1, the electronic device 1500 of FIG. 15) may execute a third application.

For example, the electronic device (e.g., the electronic device 100 of FIG. 1, the electronic device 1500 of FIG. 15) according to an embodiment may perform operation 1610 for executing the third application of FIG. 16 in the same manner as a specific user input for executing the first application and the second application in operation 210 of FIG. 2.

In operation 1620, the electronic device (e.g., the electronic device 100 of FIG. 1, the electronic device 1500 of FIG. 15) may display a third execution window of the third application.

The electronic device (e.g., the electronic device 100 of FIG. 1, the electronic device 1500 of FIG. 15) according to an embodiment may perform operation 1620 of executing the third application of FIG. 16 in a manner corresponding to displaying the second execution window of the second application in operation 230 of FIG. 2.

For example, according to an embodiment, the electronic device 100 may display the third execution window 1530 in at least a partial region of the display 101. For example, the electronic device 100 may display the third execution window 1530 in a pop-up form or a PIP form on at least a partial region of the regions of the display 101, in response to the specific preset user input.

According to an embodiment, the electronic device 100 may display the third execution window 1530 not to overlap the first execution window 1510.

According to an embodiment, the electronic device 100 may display the third execution window 1530 to overlap the first execution window 1510.

According to an embodiment, the electronic device 100 may display the third execution window 1530 not to overlap the second execution window 1520.

According to an embodiment, the electronic device 100 may display the third execution window 1530 to overlap the second execution window 1520.

In operation 1630, the electronic device (e.g., the electronic device 100 of FIG. 1, the electronic device 1500 of FIG. 15) may receive a second user input for moving the third execution window over the first execution window.

In the electronic device 100 according to an embodiment, the second user input may correspond to the manner of the first user input 199 of FIG. 1. For example, if the form of the third execution window 1530 is the pop-up window form, the second user input may be a user input for touching and holding the third execution window 1530 displayed on the display 101 and dragging the third execution window 1530 over the rendering region 1511 within the first execution window 1510. For example, the second user input may be a user input for expanding or reducing the size of the exposed region of the display 101, if the electronic device 100 is a slidable electronic device.

In operation 1640, the electronic device (e.g., the electronic device 100 of FIG. 1, the electronic device 1500 of FIG. 15) may determine whether the first execution window and the third execution window overlap at least in part.

According to an embodiment, the electronic device 100 may determine whether at least a part of the first execution window 1510 and the third execution window 1530 overlap, based on position information (or coordinate information) and size information of each of the first execution window 1510 and the third execution window 1530 on the display 101.

According to an embodiment, the position information (or the coordinate information) of the execution windows may be a data value corresponding to a specific position of the display 101.

According to an embodiment, the electronic device 100 may prestore the position information (or the coordinate information) of the execution windows in the memory 1902 in a specific data format. According to an embodiment, the electronic device 100 may prestore the position information (or the coordinate information) of the execution windows, in a specific data format on a server (e.g., the server 1808 of FIG. 18) using a network (e.g., the second network 1899 of FIG. 18). For example, the data format of the position information of the execution windows stored in the memory 1902 of the electronic device 100 may be, but not limited to, a table format, an array format, or a list format.

According to an embodiment, in response to receiving the second user input, if the third execution window 1530 moves over the first execution window 1510, the electronic device 100 may dynamically update the data values corresponding to the position information of the third execution window 1530 stored in the memory 1902. According to an embodiment, if the third execution window 1530 moves over the rendering region 1511 within the first execution window 1510 in response to receiving the second user input, the electronic device 100 may dynamically transmit the data values corresponding to the position information of the third execution window 1530 to the server (e.g., the server 1808 of FIG. 18) over the network (e.g., the second network 1899 of FIG. 18).

According to an embodiment, the electronic device 100 may identify area coordinates of the first execution window 1510 and area coordinates of the third execution window 1530 based on the data values corresponding to the position information of the first execution window 1510 and the data values corresponding to the position information of the third execution window 1530. According to an embodiment, if the area coordinates of the first execution window 1510 and the area coordinates of the third execution window 1530 intersect, the electronic device 100 may determine that the first execution window 1510 and the third execution window 1530 overlap at least in part.

In operation 1650, based on determining in operation 1640 that the first execution window and the third execution window overlap at least in part, the electronic device (e.g., the electronic device 100 of FIG. 1, the electronic device 1500 of FIG. 15) may identify the second non-overlapping region not obscured by the second execution window and the third execution window in the rendering region.

In the electronic device 100 according to an embodiment, the second non-overlapping region 1513 may be a region not obscured by the first execution window 1510 and the second execution window 1520 in the rendering region 1511 of the first execution window 1510. The electronic device 100 according to an embodiment may display at least one visual object of the first application in the second non-overlapping region 1513.

According to an embodiment, the electronic device 100 may determine as the second non-overlapping region 1513 a region excluding the overlapping region 1512 obscured by at least one of the second execution window 1520, or the third execution window 1530 of the rendering region 1511 of the first execution window 1510 in the rendering region 1511.

In the electronic device 100 according to an embodiment, the size of the second non-overlapping region 1513 if the first execution window 1510 overlaps the second execution window 1520 and does not overlap the third execution window 1530 may be different from the size of the second non-overlapping region 1513 if the rendering region 1511 within the first execution window 1510 overlaps with the second execution window 1520 and the third execution window 1530. For example, referring to the reference numeral 1501 and the reference numeral 1502, the size of the second non-overlapping region 1513 if the first execution window 1510 overlaps the second execution window 1520 but does not overlap the third execution window 1530 may be greater than the size of the second non-overlapping region 1513 if the rendering region 1511 within the first execution window 1510 overlaps the second execution window 1520 and the third execution window 1530.

In operation 1660, the electronic device (e.g., the electronic device 100 of FIG. 1, the electronic device 1500 of FIG. 15) may determine a third rendering frequency for displaying the visual object of the first application in the second non-overlapping region.

Specific operations for considering at least one of the sizes of various regions or the attributes of the first execution window to determine the third rendering frequency in operation 1660 may correspond to at least one of operations 610 through 632 of FIG. 6, operation 800 of FIG. 8, operation 261 of FIG. 2, operation 1110 through operation 1150 of FIG. 11, or operation 1210 through operation 1250 of FIG. 12.

For example, according to an embodiment, the electronic device 100 may determine the third rendering frequency based on at least two or more of the rendering region 1511, the overlapping region 1512, and the second non-overlapping region 1513. For example, the electronic device 100 may determine the third rendering frequency based on a ratio of the size of the second non-overlapping region 1513 to the size of the rendering region 1511. For example, the electronic device 100 may determine the third rendering frequency based on a ratio of the size of the overlapping region 1512 to the size of the rendering region 1511. For example, the electronic device 100 may determine the third rendering frequency based on a ratio of the size of the second non-overlapping region 1513 to a sum of the size of the overlapping region 1512 and the size of the second non-overlapping region 1513. For example, the electronic device 100 may determine the third rendering frequency based on a ratio of the size of the overlapping region 1512 to the sum of the size of the overlapping region 1512 and the size of the second non-overlapping region 1513.

In the electronic device 100 according to an embodiment, the third rendering frequency determined based on the size of the second non-overlapping region 1513 if the first execution window 1510 overlaps the second execution window 1520 and does not overlap the third execution window 1530 may be different from the third rendering frequency determined based on the size of the second non-overlapping region 1513 if the first execution window 1510 overlaps the second execution window 1520 and the third execution window 1530. For example, referring to the reference numeral 1501 and the reference numeral 1502, the third rendering frequency (e.g., 60 Hz) determined based on the size of the second non-overlapping region (e.g., the second non-overlapping region 1513 of the reference numeral 1501) if the first execution window 1510 overlaps the second execution window 1520 and does not overlap the third execution window 1530 may be greater than the third rendering frequency (e.g., 30 Hz) determined based on the size of the second non-overlapping region (e.g., the second non-overlapping region 1513 of the reference numeral 1502) if the rendering region 1511 within the first execution window 1510 overlaps the second execution window 1520 and the third execution window 1530. In operation 1670, the electronic device (e.g., the electronic device 100 of FIG. 1, the electronic device 1500 of FIG. 15) may display the visual object of the first application in the second non-overlapping region, at the third rendering frequency determined in operation 1660.

The electronic device 100 according to an embodiment may calculate a synchronization period corresponding to the third rendering frequency determined in operation 1660. For example, if the third rendering frequency determined in operation 1660 is 60 Hz, the electronic device 100 according to an embodiment may calculate 16.68 ms corresponding to 60 Hz as the synchronization period. For example, if the third rendering frequency determined in operation 261 is 30 Hz, the electronic device 100 according to an embodiment may calculate 33.34 ms corresponding to 30 Hz as the synchronization period.

According to an embodiment, the electronic device 100 may transmit the calculated synchronization period value to the first application to control the first application to perform rendering at the third rendering frequency. For example, if the calculated synchronization period value is 16.68 ms, the electronic device 100 according to an embodiment may transmit the calculated synchronization period value of 16.68 ms to the first application, such that the first application renders the visual object displayed in the first execution window at every rendering frequency (60 Hz) corresponding to 16.68 ms. For example, if the calculated synchronization period value is 33.34 ms, the electronic device 100 according to an embodiment may transmit the calculated synchronization period value of 33.34 ms to the first application, such that the first application renders the visual object displayed in the first execution window at every rendering frequency (30 Hz) corresponding to 33.34 ms.

The electronic device 100 according to an embodiment may display the visual object in the second non-overlapping region 113 at the third rendering frequency.

In the electronic device 100 according to an embodiment, the visual object displayed in the second non-overlapping region 1513 in operation 1670 of FIG. 16 may be a part of the visual object displayed in the first non-overlapping region 113 in operation 262 of FIG. 2. In the electronic device 100 according to an embodiment, the visual object displayed in the second non-overlapping region 1513 in operation 1670 may be a part of the visual object displayed in the first non-overlapping region 113 in operation 270 of FIG. 2.

Figure 17:
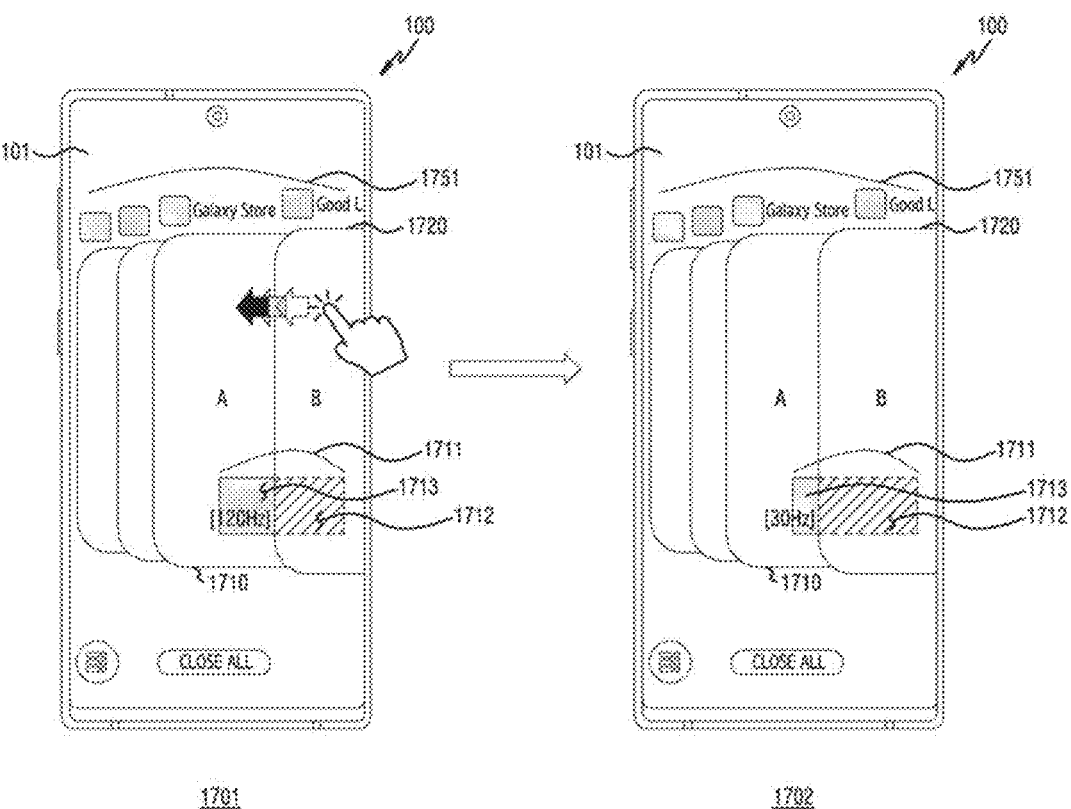
FIG. 17 is an example illustrating a method of an electronic device 100 for determining a second rendering frequency, if a first execution window and a second execution window are displayed through an execution list displaying execution windows of running applications according to an embodiment.

FIG. 17 is an example illustrating a method for an electronic device 100 to determine a second rendering frequency, if a first execution window and a second execution window are displayed through an execution list displaying execution windows of executed applications according to an embodiment.

A reference numeral 1701 of FIG. 17 may correspond to the reference numeral 191 of FIG. 1. A reference numeral 1702 of FIG. 17 may correspond to the reference numeral 192 of FIG. 1. A first execution window 1710 of FIG. 17 may correspond to the first execution window 110 of FIG. 1. A second execution window 1720 of FIG. 17 may correspond to the second execution window 120 of FIG. 1. A rendering region 1711 of FIG. 17 may correspond to the rendering region 111 of FIG. 1. An overlapping region 1712 of FIG. 17 may correspond to the overlapping region 112 of FIG. 1. A first non-overlapping region 1713 of FIG. 17 may correspond to the first non-overlapping region 113 of FIG. 1.

Referring to the reference numeral 1701 in FIG. 17, the electronic device 100 according to an embodiment may display execution windows of a plurality of applications on the display 101 using the execution list. For example, the electronic device 100 according to an embodiment may display the first execution window 1710 on an execution list 1751. For example, the electronic device 100 according to an embodiment may display the second execution window 1720 on the execution list 1751.

Referring to the reference numeral 1701 in FIG. 17, the electronic device 100 according to an embodiment may move the first execution window 1710 over the second execution window 1720 in response to receiving a preset user input of moving the second execution window 1720 over the first execution window 1710. For example, the electronic device 100 may receive a user's touch on the list 1751 and, a swipe gesture input to the left and move the second execution window 1720 to the left.

For example, the electronic device 100 may receive the user's touch on the execution list 1751 and the swipe gesture input to the right and move the second execution window 1720 to the right.

Referring to the reference numeral 1702 in FIG. 17, if determining that the first execution window 1710 and the second execution window 1720 overlap, the electronic device 100 according to an embodiment may determine a second rendering frequency for displaying a visual object of the first application. For example, the electronic device 100 according to an embodiment may determine the second rendering frequency (e.g., [30 Hz]) for displaying the first non-overlapping region 1713 not obscured by the second execution window 1720 in the rendering region 1711 of the first execution window 1710 of the first application obscured by the overlay of the second execution window 1720 of the second application, and display the first non-overlapping region 1713 at the determined second rendering frequency (e.g., [30 Hz]).

FIG. 18 is a block diagram illustrating an electronic device 1801 in a network environment 1800 according to various embodiments.

Referring to FIG. 18, the electronic device 1801 in the network environment 1800 may communicate with an electronic device 1802 via a first network 1898 (e.g., a short-range wireless communication network), or at least one of an electronic device 1804 or a server 1808 via a second network

1899 (e.g., a long-range wireless communication network). According to an embodiment, the electronic device 1801 may communicate with the electronic device 1804 via the server 1808. According to an embodiment, the electronic device 1801 may include a processor 1820, memory 1830, an input module 1850, a sound output module 1855, a display module 1860, an audio module 1870, a sensor module 1876, an interface 1877, a connecting terminal 1878, a haptic module 1879, a camera module 1880, a power management module 1888, a battery 1889, a communication module 1890, a subscriber identification module (SIM) 1896, or an antenna module 1897. In some embodiments, at least one of the components (e.g., the connecting terminal 1878) may be omitted from the electronic device 1801, or one or more other components may be added in the electronic device 1801. In some embodiments, some of the components (e.g., the sensor module 1876, the camera module 1880, or the antenna module 1897) may be implemented as a single component (e.g., the display module 1860).

The processor 1820 may execute, for example, software (e.g., a program 1840) to control at least one other component (e.g., a hardware or software component) of the electronic device 1801 coupled with the processor 1820, and may perform various data processing or computation. According to one embodiment, as at least part of the data processing or computation, the processor 1820 may store a command or data received from another component (e.g., the sensor module 1876 or the communication module 1890) in volatile memory 1832, process the command or the data stored in the volatile memory 1832, and store resulting data in non-volatile memory 1834. According to an embodiment, the processor 1820 may include a main processor 1821 (e.g., a central processing unit (CPU) or an application processor (AP)), or an auxiliary processor 1823 (e.g., a graphics processing unit (GPU), a neural processing unit (NPU), an image signal processor (ISP), a sensor hub processor, or a communication processor (CP)) that is operable independently from, or in conjunction with, the main processor 1821. For example, when the electronic device 1801 includes the main processor 1821 and the auxiliary processor 1823, the auxiliary processor 1823 may be adapted to consume less power than the main processor 1821, or to be specific to a specified function. The auxiliary processor 1823 may be implemented as separate from, or as part of the main processor 1821.

The auxiliary processor 1823 may control at least some of functions or states related to at least one component (e.g., the display module 1860, the sensor module 1876, or the communication module 1890) among the components of the electronic device 1801, instead of the main processor 1821 while the main processor 1821 is in an inactive (e.g., sleep) state, or together with the main processor 1821 while the main processor 1821 is in an active state (e.g., executing an application). According to an embodiment, the auxiliary processor 1823 (e.g., an image signal processor or a communication processor) may be implemented as part of another component (e.g., the camera module 1880 or the communication module 1890) functionally related to the auxiliary processor 1823. According to an embodiment, the auxiliary processor 1823 (e.g., the neural processing unit) may include a hardware structure specified for artificial intelligence model processing. An artificial intelligence model may be generated by machine learning. Such learning may be performed, e.g., by the electronic device 1801 where the artificial intelligence is performed or via a separate server (e.g., the server 1808). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1830 may store various data used by at least one component (e.g., the processor 1820 or the sensor module 1876) of the electronic device 1801. The various data may include, for example, software (e.g., the program 1840) and input data or output data for a command related thererto. The memory 1830 may include the volatile memory 1832 or the non-volatile memory 1834.

The program 1840 may be stored in the memory 1830 as software, and may include, for example, an operating system (OS) 1842, middleware 1844, or an application 1846.

The input module 1850 may receive a command or data to be used by another component (e.g., the processor 1820) of the electronic device 1801, from the outside (e.g., a user) of the electronic device 1801. The input module 1850 may include, for example, a microphone, a mouse, a keyboard, a key (e.g., a button), or a digital pen (e.g., a stylus pen).

The sound output module 1855 may output sound signals to the outside of the electronic device 1801. The sound output module 1855 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1860 may visually provide information to the outside (e.g., a user) of the electronic device 1801. The display module 1860 may include, for example, a display, a hologram device, or a projector and control circuitry to control a corresponding one of the display, hologram device, and projector. According to an embodiment, the display module 1860 may include a touch sensor adapted to detect a touch, or a pressure sensor adapted to measure the intensity of force incurred by the touch.

The audio module 1870 may convert a sound into an electrical signal and vice versa. According to an embodiment, the audio module 1870 may obtain the sound via the input module 1850, or output the sound via the sound output module 1855 or a headphone of an external electronic device (e.g., an electronic device 1802) directly (e.g., wiredly) or wirelessly coupled with the electronic device 1801.

The sensor module 1876 may detect an operational state (e.g., power or temperature) of the electronic device 1801 or an environmental state (e.g., a state of a user) external to the electronic device 1801, and then generate an electrical signal or data value corresponding to the detected state. According to an embodiment, the sensor module 1876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1877 may support one or more specified protocols to be used for the electronic device 1801 to be coupled with the external electronic device (e.g., the electronic device 1802) directly (e.g., wiredly) or wirelessly. According to an embodiment, the interface 1877 may include, for example, a high definition multimedia interface (HDMI), a universal serial bus (USB) interface, a secure digital (SD) card interface, or an audio interface.

A connecting terminal 1878 may include a connector via which the electronic device 1801 may be physically connected with the external electronic device (e.g., the electronic device 1802). According to an embodiment, the connecting terminal 1878 may include, for example, a HDMI connector, a USB connector, a SD card connector, or an audio connector (e.g., a headphone connector).

The haptic module 1879 may convert an electrical signal into a mechanical stimulus (e.g., a vibration or a movement) or electrical stimulus which may be recognized by a user via his tactile sensation or kinesthetic sensation. According to an embodiment, the haptic module 1879 may include, for example, a motor, a piezoelectric element, or an electric stimulator.

The camera module 1880 may capture a still image or moving images. According to an embodiment, the camera module 1880 may include one or more lenses, image sensors, image signal processors, or flashes.

The power management module 1888 may manage power supplied to the electronic device 1801. According to one embodiment, the power management module 1888 may be implemented as at least part of, for example, a power management integrated circuit (PMIC).

The battery 1889 may supply power to at least one component of the electronic device 1801. According to an embodiment, the battery 1889 may include, for example, a primary cell which is not rechargeable, a secondary cell which is rechargeable, or a fuel cell.

The communication module 1890 may support establishing a direct (e.g., wired) communication channel or a wireless communication channel between the electronic device 1801 and the external electronic device (e.g., the electronic device 1802, the electronic device 1804, or the server 1808) and performing communication via the established communication channel. The communication module 1890 may include one or more communication processors that are operable independently from the processor 1820 (e.g., the application processor (AP)) and supports a direct (e.g., wired) communication or a wireless communication. According to an embodiment, the communication module 1890 may include a wireless communication module 1892 (e.g., a cellular communication module, a short-range wireless communication module, or a global navigation satellite system (GNSS) communication module) or a wired communication module 1894 (e.g., a local area network (LAN) communication module or a power line communication (PLC) module). A corresponding one of these communication modules may communicate with the external electronic device via the first network 1898 (e.g., a short-range communication network, such as Bluetooth™, wireless-fidelity (Wi-Fi) direct, or infrared data association (IrDA)) or the second network 1899 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1892 may identify and authenticate the electronic device 1801 in a communication network, such as the first network 1898 or the second network 1899, using subscriber information (e.g., international mobile subscriber identity (IMSI)) stored in the subscriber identification module 1896.

The wireless communication module 1892 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1892 may support a high-frequency band (e.g., the mmWave band) to achieve, e.g., a high data transmission rate. The wireless communication module 1892 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1892 may support various requirements specified in the electronic device 1801, an external electronic device (e.g., the electronic device 1804), or a network system (e.g., the second network 1899). According to an embodiment, the wireless communication module 1892 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1897 may transmit or receive a signal or power to or from the outside (e.g., the external electronic device) of the electronic device 1801. According to an embodiment, the antenna module 1897 may include an antenna including a radiating element composed of a conductive material or a conductive pattern formed in or on a substrate (e.g., a printed circuit board (PCB)). According to an embodiment, the antenna module 1897 may include a plurality of antennas (e.g., array antennas). In such a case, at least one antenna appropriate for a communication scheme used in the communication network, such as the first network 1898 or the second network 1899, may be selected, for example, by the communication module 1890 (e.g., the wireless communication module 1892) from the plurality of antennas. The signal or the power may then be transmitted or received between the communication module 1890 and the external electronic device via the selected at least one antenna. According to an embodiment, another component (e.g., a radio frequency integrated circuit (RFIC)) other than the radiating element may be additionally formed as part of the antenna module 1897.

According to various embodiments, the antenna module 1897 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mm Wave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1801 and the external electronic device 1804 via the server 1808 coupled with the second network 1899. Each of the electronic devices 1802 or 1804 may be a device of a same type as, or a different type, from the electronic device 1801. According to an embodiment, all or some of operations to be executed at the electronic device 1801 may be executed at one or more of the external electronic devices 1802, 1804, or 1808. For example, if the electronic device 1801 should perform a function or a service automatically, or in response to a request from a user or another device, the electronic device 1801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1801. The electronic device 1801 may provide the outcome, with or without further processing of the outcome, as at least part of a reply to the request. To that end, a cloud computing, distributed computing, mobile edge computing (MEC), or client-server computing technology may be used, for example. The electronic device 1801 may provide ultra low-latency services using, e.g., distributed computing or mobile edge computing. In another embodiment, the external electronic device 1804 may include an internet-of-things (IoT) device. The server 1808 may be an intelligent server using machine learning and/or a neural network. According to an embodiment, the external electronic device 1804 or the server 1808 may be included in the second network 1899. The electronic device 1801 may be applied to intelligent services (e.g., smart home, smart city, smart car, or health-care) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with,"

"coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1840) including one or more instructions that are stored in a storage medium (e.g., internal memory 1836 or external memory 1838) that is readable by a machine (e.g., the electronic device 1801). For example, a processor (e.g., the processor 1820) of the machine (e.g., the electronic device 1801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 19 is a block diagram of an electronic device according to an embodiment.

An electronic device 1900 according to an embodiment may include a display 1901, a memory 1902, and a processor 1903.

The electronic device 1900 of FIG. 19 may correspond to the electronic device 100 of FIG. 1, the electronic device 1300 of FIG. 13, the electronic device 1400 of FIG. 14, or the electronic device 1801 of FIG. 18. The electronic device 1900 according to an embodiment may be, for example, but not limited to, a smartphone, a tablet PC, a mobile phone, a PDA, a laptop, a media player, a wearable device worn by the user, a consumer electronics device, or other mobile computing device. The electronic device 1900 according to an embodiment may determine a rendering frequency for displaying a visual object in a non-overlapping region not obscured by execution windows of other applications in a rendering region within an application execution window obscured based on the degree of overlapping of the execution windows of the plurality of running applications.

The display 1901 of FIG. 19 may correspond to the display 101 of FIG. 1, the display 1301 of FIG. 13, or the display 1801 of FIG. 18. In the electronic device 1900 according to an embodiment, the display 1901 may display an execution window of an application in at least a part of the display 1901. In the electronic device 1900 according to an embodiment, the display 1901 may display a visual object of the application in at least a partial region of the display 1901. The display 1901 of the electronic device 1900 according to an embodiment may refresh the screen at regular intervals based on a set refresh rate. In the electronic device 1900 according to an embodiment, the display 1901 may transmit a synchronization period value to the application, in response to receiving a rendering request from the application. For example, the display 1901 of the electronic device 1900 according to an embodiment may be, but not limited to, a foldable display which may be folded or unfolded by one or more hinges, or an expandable slidable display.

The memory 1902 of FIG. 19 may correspond to the memory 1830 of FIG. 18. The memory of the electronic device 1900 according to an embodiment may store a preset user input for executing an application. The memory of the electronic device 1900 according to an embodiment may store a preset user input for moving the execution window of the application. The memory of the electronic device 1900 according to an embodiment may store data relating to position information of the application execution window and data relating to area coordinates of the application execution window. The memory of the electronic device 1900 according to an embodiment may store a threshold compared with the ratio of the size of the non-overlapping region to the size of the rendering region, which is used to determining the rendering frequency for displaying a visual object of the application. The memory of the electronic device 1900 according to an embodiment may store a preset default rendering frequency for the application to display the execution window. The memory of the electronic device 1900 according to an embodiment may store a rendering frequency determined by the electronic device 1900, which is different from the default rendering frequency.

The processor 1903 of FIG. 19 may correspond to the processor 1820 of FIG. 18. The processor 1903 may be operatively coupled to the memory 1902 and the display 1901.

The processor 1903 of the electronic device 1900 according to an embodiment controls general operations of the electronic device 1900. For example, the processor 1903 of the electronic device 1900 according to an embodiment may execute an application, in response to receiving an event for executing an application stored in the memory 1902 of the electronic device 1900. For example, in response to receiving a user touch input on the display 1901, the processor 1903 may perform a preset corresponding operation. For example, the processor 1903 may receive a user's touch-and-drag input to the execution window of the running application, and move the execution window to a different region on the display 1901.

The processor 1903 of the electronic device 1900 according to an embodiment may include a UI framework module for processing an event related to the UI of the application. For example, the UI framework may receive a user input for the application. For example, in response to receiving a touch input of the user, the UI framework may move the execution window of the application to a different region of the display. For example, if a priority of the first application is lower than a priority of the second application, the UI framework may control to display the second execution window 120 of the second application prior to the first execution window 110 of the first application.

The processor 1903 of the electronic device 1900 according to an embodiment may determine the rendering frequency for displaying the execution window of the application on the display 1901, and control general operations for displaying the visual object of the application based on the determined rendering frequency. Displaying the visual object based on the rendering frequency at the processor 1903 may include the following operations. For example, if receiving a rendering request to update the screen for the visual object of the application, in response to receiving the rendering request, the processor 1903 may identify coordinate information relating to an overlapping region of execution windows of applications and transmit it to a module which manages the visual object rendering. For example, the processor 1903 may analyze the coordinates and the size of the non-overlapping region in the rendering region based on the received coordinate information of the overlapping region. For example, the processor 1903 may determine the second rendering frequency based on a preset threshold based on an analysis result of the coordinates and the size of the non-overlapping region. For example, the processor 1903 may transmit the determined final refresh rate to a module for generating the synchronization signal. For example, the processor 1903 may transmit the generated synchronization signal to the application. For example, the processor 1903 may control the application to perform rendering based on the rendering frequency corresponding to the received synchronization signal. For example, the processor 1903 may store in a buffer memory, image data generated as the application performs the rendering. For example, the processor 1903 may generate frames to be displayed on the display 1901 using the image data stored in the buffer memory. For example, the processor 1903 may transmit the generated frames to the display 1901. For example, the processor 1903 may control the display 1901 to output the received frames according to a preset refresh rate of the display 1901.

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

In the present disclosure, a function or operation performed by an electronic device may be performed by at least one processor executing at least one instruction stored in memory. The functions or operations of the electronic devices referred to in this disclosure may be performed by a single processor executing at least one instruction, or by a combination of a plurality of processors executing at least one instruction. A processor as referred to in this disclosure is understood to include circuitry for performing operations or controlling other components of an electronic device. For example, the at least one processor may include a central processing unit (CPU), micro-processor unit (MPU), application processor (AP), communication processor (CP), neural processing unit (NPU), system on chip (SoC), or integrated circuit (IC) configured to execute at least one instruction. The at least one processor may be configured to perform the operations of the electronic device described above.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the disclosure. In addition, an additional storage device on a communication network may access to a device which performs the embodiments of the disclosure.

In the above-described specific embodiments of the disclosure, elements included in the disclosure are expressed in singular or plural forms according to specific embodiments. However, singular or plural forms are appropriately selected according to presented situations for convenience of explanation, and the disclosure is not limited to a single element or plural elements. An element which is expressed in a plural form may be configured in a singular form or an element which is expressed in a singular form may be configured in plural number.

The term "unit" or "module" used in the disclosure refer to a hardware component such as a processor or a circuit, and/or a software component executed by a hardware component such as a processor.

A "unit", "module" may be implemented by a program that is stored in a storage medium which may be addressed, and is executed by a processor. For example, a "unit", "module" may be implemented by components such as software components, object-oriented software components, class components, and task components, processes, functions, attributes, procedures, sub-routines, segments of a program code, drivers, firmware, a micro code, a circuit, data, a database, data structures, tables, arrays and parameters.

Specific execution explained in the disclosure is merely an example, and the scope of the disclosure is not limited by any method. For the sake of clarity of the specification, descriptions of related-art electronic components, control systems, software, and other functional aspects of the systems are omitted.

In the disclosure, such phrase as "including at least one of a, b, or c" may refer to "including only a", "including only b", "including only c", "including a and b", "including b and c, "including a and c", "including all of a, b, c".

While specific embodiments have been described in the detailed descriptions of the disclosure, it will be understood by those skilled in the art that various changes in form and details may be made therein without departing from the spirit and scope of the disclosure. Therefore, the scope of the disclosure is defined not by explained embodiments but by the appended claims and equivalents to the claims.

What is claimed is:

1. A method of an electronic device for displaying an execution window of an application via a display, the method comprising:

executing a first application and a second application;

displaying, via the display, a first execution window of the first application, and a visual object provided by the first application at a first rendering frequency in a rendering region within the first execution window;

displaying, via the display, a second execution window of the second application;

obtaining a first user input to move the second execution window over the first execution window;

based on obtaining the first user input, identifying whether the first execution window and the second execution window overlap at least in part;

in accordance with identifying that the first execution window and the second execution window overlap at least in part, determining a second rendering frequency for displaying at least a part of the visual object in a first non-overlapping region based on at least two of a size of an overlapping region being obscured by the second execution window in the rendering region of the first execution window, a size of the first non-overlapping region being not obscured by the second execution window in the rendering region of the first execution window, or size of the rendering region; and displaying, via the display, the visual object in the first non-overlapping region at the second rendering frequency.

2. The method of claim 1, wherein identifying the second rendering frequency comprises:

identifying a ratio of the size of the first non-overlapping region to the size of the rendering region;

identifying whether the identified ratio is smaller than a first threshold; and based on identifying that the identified ratio is smaller than the first threshold, identifying the second rendering frequency as smaller than the first rendering frequency.

3. The method of claim 1, further comprising:

identifying a ratio of the size of the first non-overlapping region to the size of the rendering region;

identifying whether the identified ratio is smaller than a second threshold; and based on identifying that the identified ratio is smaller than the second threshold, stopping rendering the rendering region.

4. The method of claim 1, wherein identifying the second rendering frequency comprises, identifying the second rendering frequency, based on at least one of a ratio of a size of the first execution window to a size of a whole region of the display, a ratio of the size of the rendering region to the size of the whole region of the display, or a ratio of a size of a display region not displaying the first execution window and the second execution window to the size of the whole region of the display.

5. The method of claim 1, wherein identifying the second rendering frequency comprises, identifying the second rendering frequency based on at least one of a transparency applied to the first execution window, a blur effect level applied to the first execution window, or a color of an edge of a user interface (UI) object of the first application displayed in the rendering region.

6. The method of claim 1, wherein the display is unfoldable or foldable by at least one or more hinges.

7. The method of claim 1, wherein the electronic device is a head mounted device (HMD) device, and displaying the first execution window and the second execution window comprises displaying, via the display, an image generated in a video-see-through manner.

8. The method of claim 1, further comprising:

display, via the display, a third execution window of a third application;

obtaining a second user input to move the third execution window over the first execution window;

based on obtaining the second user input, identifying whether the first execution window and the third execution window overlap at least in part;

in accordance with identifying that the first execution window and the third execution window overlap at least in part, determining a second non-overlapping region not obscured by the second execution window and the third execution window in the rendering region of the first execution window;

identifying a third rendering frequency for displaying the visual object in the second non-overlapping region based on the determined second non-overlapping region and the rendering region; and displaying, via the display, the visual object in the second non-overlapping region at the third rendering frequency.

9. The method of claim 1, wherein the first execution window and the second execution window are included in an execution list representing execution histories of applications executed on the electronic device.

10. The method of claim 1, wherein a whole region of the display is divided into a plurality of regions by multiple windows, wherein displaying the first execution window comprises displaying the first execution window as one of the multiple windows, and wherein displaying the second execution window comprises displaying the second execution window in a picture in picture (PIP) form or in a pop-up window form.

11. An electronic device comprising:

a display;

a memory for storing instructions; and at least one processor, wherein the instructions, when executed by the at least one processor individually or collectively, cause the electronic device to:

execute a first application and a second application;

display, via the display, a first execution window of the first application and a visual object provided by the first application at a first rendering frequency in a rendering region within the first execution window;

display, via the display, a second execution window of the second application, obtain a first user input for moving the second execution window over the first execution window;

based on obtaining the first user input, identify whether the first execution window and the second execution window overlap at least in part;

in accordance with identifying that the first execution window and the second execution window overlap at least in part, determine a second rendering frequency for displaying at least a part of the visual object in a first non-overlapping region based on at least two of a size of an overlapping region being obscured by the second execution window in the rendering region of the first execution window, a size of the first non-overlapping region being not obscured by the second execution window in the rendering region of the first execution window, or a size of the rendering region; and display, via the display, the visual object in the first non-overlapping region at the second rendering frequency.

12. The electronic device of claim 11, wherein the instructions, when executed by the at least one processor individually or collectively, cause the electronic device to:

identify a ratio of the size of the first non-overlapping region to the size of the rendering region, identify whether the identified ratio is smaller than a first threshold, and based on identifying that the identified ratio is smaller than the first threshold, identify the second rendering frequency as a value smaller than the first rendering frequency.

13. The electronic device of claim 11, wherein the instructions, when executed by the at least one processor individually or collectively, cause the electronic device to:

identify a ratio of the size of the first non-overlapping region to the size of the rendering region, identify whether the identified ratio is smaller than a second threshold, and stop rendering the rendering region, based on identifying that the identified ratio is smaller than the second threshold.

14. The electronic device of claim 11, wherein the instructions, when executed by the at least one processor individually or collectively, cause the electronic device to:

identify the second rendering frequency, based on at least one of a ratio of a size of the first execution window to a size of a whole region of the display, a ratio of the size of the rendering region to the size of the whole region of the display, or a ratio of a size of a display region not displaying the first execution window and the second execution window to the size of the whole region of the display.

15. The electronic device of claim 11, wherein the instructions, when executed by the at least one processor individually or collectively, cause the electronic device to:

identify the second rendering frequency based on at least one of a transparency applied to the first execution window, a blur effect level applied to the first execution window, or a color of an edge of a user interface (UI) object of the first application displayed in the rendering region.

16. The electronic device of claim 11, wherein the display is unfoldable or foldable by at least one or more hinges.

17. The electronic device of claim 11, wherein the electronic device is a head mounted device (HMD) device, and wherein the instructions, when executed by the at least one processor, cause the electronic device to display, via the display, an image generated in a video-see-through manner on the display.

18. The electronic device of claim 11, wherein the instructions, when executed by the at least one processor individually or collectively, cause the electronic device to:

display, via the display, a third execution window of a third application;

obtain a second user input for moving the third execution window over the first execution window;

based on obtaining the second user input, identify whether the first execution window and the third execution window overlap at least in part;

in accordance with identifying that the first execution window and the third execution window overlap at least in part, determine a second non-overlapping region not obscured by the second execution window and the third execution window in the rendering region of the first execution window, identify a third rendering frequency for displaying the visual object in the second non-overlapping region based on the determined second non-overlapping region and the rendering region; and display, via the display, the visual object in the second non-overlapping region at the third rendering frequency.

19. The electronic device of claim 11, wherein the first execution window and the second execution window are included in an execution list representing execution histories of applications executed on the electronic device.

20. The electronic device of claim 11, wherein a whole region of the display is divided into a plurality of regions by multiple windows, and wherein the instructions, when executed by the at least one processor individually or collectively, cause the electronic device to:

display the first execution window as one of the multiple windows, and display the second execution window in a picture in picture (PIP) form or in a pop-up window form.

* * * * *